(12) United States Patent
Hashimoto

(10) Patent No.: US 10,746,970 B2
(45) Date of Patent: *Aug. 18, 2020

(54) IMAGING LENS

(71) Applicant: KANTATSU CO., LTD., Yaita-shi, Tochigi (JP)

(72) Inventor: Masaya Hashimoto, Sukagawa (JP)

(73) Assignee: KANTATSU CO., LTD., Yaita-shi, Tochigi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/448,940

(22) Filed: Jun. 21, 2019

(65) Prior Publication Data

US 2019/0310444 A1 Oct. 10, 2019

Related U.S. Application Data

(63) Continuation of application No. 15/387,206, filed on Dec. 21, 2016, now Pat. No. 10,330,892.

(30) Foreign Application Priority Data

Dec. 21, 2015 (JP) .................................. 2015-248792

(51) Int. Cl.
*G02B 13/18* (2006.01)
*G02B 3/02* (2006.01)
(Continued)

(52) U.S. Cl.
CPC ........... *G02B 13/0045* (2013.01); *G02B 9/64* (2013.01)

(58) Field of Classification Search
CPC ........ G02B 9/62; G02B 9/64; G02B 13/0045; G02B 13/18; G02B 3/04; G02B 13/04;
(Continued)

(56) References Cited

U.S. PATENT DOCUMENTS 9,523,841 B1  12/2016  Chen
10,036,876 B2  7/2018  Chen
(Continued)

FOREIGN PATENT DOCUMENTS

JP  1164730      3/1999
JP  2001-013405  1/2001
JP  2012159728   8/2012

OTHER PUBLICATIONS

Office Action, U.S. Appl. No. 16/448,961, dated Sep. 3, 2019 (12 pages).
(Continued)

*Primary Examiner* — Alicia M Harrington
(74) *Attorney, Agent, or Firm* — Hamre, Schumann, Mueller & Larson, P.C.

(57) ABSTRACT

A compact imaging lens which addresses low-profile and low F value, and corrects aberrations. An imaging lens includes a first lens having positive refractive power and a convex surface on an object side near an optical axis, a second lens, a third lens, a fourth lens, a fifth lens, a sixth lens, a seventh lens and a eighth lens having a concave surface on an image side near the optical axis as double-sided aspheric lens, wherein the second to seventh lenses each have at least one aspheric surface, and the eighth lens has pole points off an optical axis on the aspheric image-side surface.

20 Claims, 8 Drawing Sheets

(51) Int. Cl.
*G02B 13/00* (2006.01)
*G02B 9/64* (2006.01)

(58) Field of Classification Search
CPC .... G02B 13/24; G02B 27/0025; G02B 13/06;
G02B 13/22; G02B 13/00
See application file for complete search history.

(56) References Cited

U.S. PATENT DOCUMENTS 10,330,892 B2 * 6/2019 Hashimoto ........ G02B 13/0045
2017/0045714 A1 2/2017 Huang

OTHER PUBLICATIONS

Office Action, U.S. Appl. No. 16/448,972, dated Sep. 26, 2019 (12 pages).
Office Action, U.S. Appl. No. 16/448,987, dated Aug. 21, 2019 (13 pages).
Office Action, U.S. Appl. No. 16/449,002, dated Sep. 10, 2019 (12 pages).

* cited by examiner

IMAGING LENS

The present application is based on and claims priority of Japanese patent application No. 2015-248792 filed on Dec. 21, 2015, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact imaging device, and more particularly to an imaging lens which is built in an imaging device mounted in an increasingly compact and low-profile mobile phone, smartphone, or PDA (Personal Digital Assistant), or a game console, or an information terminal such as a PC and a robot, or a home appliance or a car with a camera function.

Description of the Related Art

In recent years, it becomes common that a camera function is mounted in many information terminals. Furthermore, it becomes requisites to mount the camera in mobile terminals, such as the mobile phone, smartphone, or PDA (Personal Digital Assistant) as an additional value to the products. Not only the mobile terminals, there has been increased demand of products to which a camera function is added, such as a wearable device, a game console, PC, a home appliance, and a drone, and development of such products may be rapidly proceeded. Recently, a display device built in the above information terminals becomes large and achieves high-definition, therefore high pixilation is required for an imaging lens. The imaging lens to be mounted is required to have further high-performance.

Demand of compactness in the imaging device is still strong. Therefore, regarding the image sensor, in order to realize compactness while maintaining high pixel, micronizing of pixel size has been rapidly proceeded. If the pixel size of the image sensor becomes small, received luminous quantity per one pixel is decreased and deterioration in image quality by noise becomes serious problem. In order to solve the problem, a bright optical system is required for the imaging lens, and demand of a lens having a large diameter of F1.9 or less is increased.

However, realization of the imaging lens satisfying low-profileness and low f-value at the same time is difficult, especially aberration correction in a peripheral area is difficult. Therefore, there is problem to secure proper optical performance throughout the image.

There is known a conventional imaging lens composed of eight constituent lenses, such as that disclosed in Patent Literature 1.

Patent Document 1 (JP-A-2001-13405) discloses an imaging lens having eight constituent lenses, which is composed of, in order from an object side, a first lens group having negative refractive power, a second lens group having positive refractive power and a third lens group having positive refractive power. The first lens group comprises, in order, a positive lens and a meniscus negative lens having a convex surface on an object side, the second lens group comprises, in order, a positive lens, a negative lens and a positive lens, and the third lens group comprises, in order, a double-sided concave lens having a strong curvature on the object side, a meniscus positive lens having a convex surface on an image side, and a positive lens. An aperture is provided between the second lens group and the third lens group.

The imaging lens disclosed in the above Patent Literature 1 is related to an exchange lens for a 35 mm single lens reflex camera, which has only eight constituent lenses without using aspheric surfaces, and large diameter and high-performance and is compact, and its purpose is to largely reduce cost in production. This lens achieves brightness of F2.1. The total length becomes 50 mm or more because it is used for a single lens reflex camera, and it is very difficult to apply to the mobile terminals or information devices. If there are realized low-profileness and further low F-value, by means of the lens constitution disclosed in Patent Literature 1, all of surfaces are spherical and it is difficult in aberration correction in a peripheral area and it can not be obtained high optical performance required in recent years.

SUMMARY OF THE INVENTION

The present invention has been made in view of the above problem, and an object thereof is to provide an imaging lens which is compact and low-profile applicable for the above mobile terminals and information terminals, satisfies demand of low F-value in well balance, properly correct aberrations and has high resolution thereby.

Here, low-profile implies that total track length is 18 mm or less, and ratio of the total track length and the diagonal length of the effective imaging plane of the image sensor (a ratio of total track length to diagonal length) is about 1.3. Low F-value implies brightness having F1.8 or less. The diagonal length showing a ratio of total track length to diagonal length is twice length of the maximum image height, that is, the vertical height from an optical axis to the point where a light ray incident on the imaging lens at a maximum field of view enters and forming an image on the image plane, and considered as the same parameter as diagonal length of an effective imaging plane of the image sensor.

In the present invention, a convex surface or a concave surface means that the paraxial portion of the surface (portion near the optical axis) is convex or concave. A pole point is defined as an off-axial point on an aspheric surface at which a tangential plane intersects the optical axis perpendicularly. The total track length is defined as distance from an object-side surface to an image-side surface of an optical element located nearest to the object side, when the thickness of an optical element not involved in divergence or convergence of light, such as an IR cut filter or cover glass, is air-converted.

An imaging lens according to the present invention which forms an image of an object a solid-state image sensor, in which the lenses are arranged in order from an object side to an image side, comprising:

a first lens having positive refractive power and a convex surface on an object side near an optical axis, a second lens, a third lens, a fourth lens, a fifth lens, a sixth lens, a seventh lens and a eighth lens having a concave surface on an image side near the optical axis as double-sided aspheric lens, wherein said second to seventh lenses each have at least one aspheric surface, and the eighth lens has pole points off an optical axis on the aspheric image-side surface.

In the imaging lens having the above structure, low-profileness is achieved by strengthening positive refractive power of the first lens. Because the second to seventh lenses has each have at least one aspheric surface, correction of spherical aberrations, astigmatism, field curvature and distortion is made in well balance while maintaining low-profileness. The eighth lens has a concave surface on the image side near the optical axis and aspherical surface on both sides, and corrects spherical aberrations, field curvature in a peripheral area and distortion by means of an aspheric surface formed on both surfaces. The image-side surface of the eighth lens has pole points and aspheric shape and light ray incident angle of ray incident on the image sensor is made appropriate.

The imaging lens having the above structure preferably satisfies a below conditional expression (1);

$$0.5 < \Sigma d/f < 2.1 \quad (1)$$

where f denotes the focal length of the overall optical system, and Σd denotes a distance on an optical axis from the object-side surface of a first lens to the image-side surface of the eighth lens.

The conditional expression (1) defines a distance on the optical axis from the object-side surface of the first lens to the image-side surface of the eighth lens to the focal length of the overall optical system, and it is a condition for shortening a total track length. When the value is above the upper limit of the conditional expression (1), length in the optical axis becomes too long, and shortening the total track length becomes difficult. On the other hand, if the value is below the lower limit of the conditional expression (1), the focal length of the overall optical system becomes too long relatively and field of view becomes narrow. Thereby, each lens can not secure enough thickness or an edge thickness.

All of the imaging lenses having the above structure are preferably arranged with an air interval to a lens adjacent each other.

All of the imaging lenses are arranged with an air interval without joining lens surface of lenses adjacent each other, and the number of surface on which an aspheric surface is formed is increased, appropriate correction of aberrations can be made thereby.

The imaging lens having the above structure preferably satisfies the below conditional expression (2).

$$0.1 < Ph82/ih < 0.9 \quad (2)$$

where Ph82 denotes a height perpendicular to the optical axis of the pole point formed on an image-side surface of the eighth lens; ih denotes maximum image height.

The conditional expression (2) defines a height perpendicular to the optical axis of the pole point formed on the image-side surface of the eighth lens regarding an image size. If the conditional expression (2) is satisfied, it becomes possible to properly correct off-axial astigmatism and deterioration in field curvature due to low-profileness and low F-value of the imaging lens.

According to the imaging lens having the above structure, the second lens preferably has a concave surface on the object side near the optical axis.

If the second lens has a concave surface on the object side, a refractive angle of an incident ray becomes small and it becomes easy to suppress higher-order aberration generated on this surface.

According to the imaging lens having the above structure, the third lens is preferable to be meniscus near the optical axis.

If the third lens becomes meniscus near the optical axis, the field curvature can be properly corrected.

According to the imaging lens having the above structure, if the first to sixth lenses are grouped as a front group, composite refractive power of the front group is preferably positive, and if the seventh and eighth are grouped as a rear group, composite refractive power of the rear group is preferably negative. By allocating such refractive power, telephoto properties can be maintained.

According to the imaging lens having the above structure, the seventh and eighth lenses preferably have negative refractive power.

The seventh and eighth lenses have negative refractive power and it becomes possible to share negative refractive power in two lenses arranged on the image side in well balance. Accordingly, an angle of the incident ray is controlled and astigmatism is corrected, and it becomes effective for control of an incident angle of a main light lay to the image sensor, and appropriate correction of field curvature and distortion.

According to the imaging lens having the above structure, the seventh lens is preferable to be meniscus near the optical axis.

The seventh lens is formed as meniscus near the optical axis and preferable correction on field curvature can be possible.

The imaging lens having the above structure preferably satisfies the below conditional expression (3).

$$0.3 < |r13/r14| < 4.9 \quad (3)$$

where r13 denotes the curvature radius near an optical axis of the object-side surface of the seventh lens, and r14 denotes the curvature radius near the optical axis of the image-side surface of the seventh lens.

The conditional expression (3) defines relation of the Curvature radius near the optical axis of the object side and the image side of the seventh lens, and it is a condition to properly correct spherical aberration and to moderate sensibility to shortening of the total track length and production error. If the seventh lens is meniscus and has a convex surface on the object side near the optical axis, when a value is above the upper limit of the conditional expression (3), refractive power on the image-side surface of the seventh lens becomes too strong. Thereby, aberrations generated on this surface are increased and the sensitivity to the product error is increased. On the other hand, if the seventh lens is meniscus and has a concave surface on the object side near the optical axis, when a value is below the lower limit of the conditional expression (3), refractive power of the object-side surface of the seventh lens becomes too strong. Thereby, aberrations generated on this surface are increased and the sensitivity to the product error is increased.

According to an imaging lens having the above structure, the eighth lens preferably adopts plastic material.

The eighth lens adopts the plastic material and aspheric shape provided on both surfaces can be stably obtained and cost may be reduced.

According to an imaging lens having the above structure, the conditional expression (4) below is preferably satisfied, $$0.2 < r16/f < 0.8 \quad (4)$$

where r16 denotes the curvature radius of the image-side surface of the eighth lens, and f denotes a focal length of the overall optical system.

The conditional expression (4) defines a condition for properly setting the curvature radius on the image-side surface of the eighth lens, and also the condition for suppressing generation of astigmatism, coma aberration and distortion and low-profileness. When a value is above the upper limit of the conditional expression (4), negative refractive power on the image-side surface of the eighth lens becomes too weak, and it becomes difficult to correct astigmatism and coma aberration. On the other hand, when the value is below the lower limit of the conditional expression (4), negative refractive power on the image-side surface of the eighth lens becomes too strong, and it becomes difficult to shorten the total track length and correct distortion.

The imaging lens having the above structure preferably satisfies the below conditional expression (5), $$0.4<|f/f7|+|f/f8|<2.2 \quad (5)$$

where f denotes a focal length of the overall optical system, f7 denotes a focal length of the seventh lens, and f8 denotes a focal length of the eighth lens.

The conditional expression (5) properly defines appropriate range of focal lengths of the seventh and eighth lenses, respectively, and when the conditional expression is satisfied, the total track length can be effectively shortened.

The imaging lens having the above structure preferably satisfies the below conditional expression (6), $$15<vd8-vd7<52 \quad (6)$$

where vd7 denotes an Abbe number of the seventh lens at d-ray, and vd8 is an Abbe number of the eighth lens at d-ray.

The conditional expression (6) properly defines appropriate range of Abbe number of the seventh and eighth lenses at d-ray and is a condition for proper correction of chromatic aberrations. Materials satisfying the conditional expression (6) are adopted, and chromatic aberrations can be properly corrected. The material within a range of the conditional expression shows availability of selecting low-cost plastics and contributes to reduce cost.

The imaging lens having the above structure preferably satisfies the below conditional expression (7), $$f123/f<3.5 \quad (7)$$

where f denotes a focal length of the overall optical system, f123 denotes a composite focal length of the first, second and third lenses.

The conditional expression (7) defines relation of the composite focal length of the first, second and third lenses and a focal length of the overall optical system.

When a value is above the upper limit of the conditional expression (7), the composite focal length of the first, second and third lenses becomes too weak and it becomes difficult to shorten the total track length.

The imaging lens having the above structure preferably satisfies the below conditional expression (8), $$-1.9<f/f8<-0.07 \quad (8)$$

where f denotes a focal length of the overall optical system, f8 denotes a focal length of the eighth lens.

The conditional expression (8) defines relation a focal length of the overall optical system of the imaging lens and a focal length of the eighth lens. When a value is above the upper limit of the conditional expression (8), negative refractive power of the eighth lens become too weak, and it becomes difficult to correct field curvature. On the other hand, when the value is below the lower limit of the conditional expression (8), negative refractive power of the eighth lens becomes too strong, and it is not preferable that an incident angle of a main light lay to the image plane (an image sensor) becomes too large.

The imaging lens having the above structure preferably satisfies the below conditional expression (9), $$0.6<TTL/2ih<1.3 \quad (9)$$

where TTL denotes a total track length, ih denotes maximum image height.

The conditional expression (9) defines ratio of total track length to diagonal length. When a value is above the upper limit of the conditional expression (9), the total track length becomes too long and it becomes difficult to respond demand of low-profileness. On the other hand, when the value is below the lower limit of the conditional expression (9), the total track length becomes too short therefore, it is not preferable that the correction of aberrations becomes difficult and error sensitivity at production becomes increased.

The imaging lens having the above structure preferably satisfies the below conditional expression (10), $$0.5<ih/f<0.9 \quad (10)$$

where f denotes a focal length of the overall optical system, ih denotes maximum image height.

The conditional expression (10) defines appropriate range of photographing field of view. When a value is above the upper limit of the conditional expression (10), the field of view becomes too large to properly correct aberrations. Therefore, it becomes difficult to correct aberrations in peripheral area of the image, and deterioration in image quality may occur easily. On the other hand, when the value is below the lower limit of the conditional expression (10), correction of aberrations can be easily performed, however, addressing wide field of view is not enough.

The imaging lens having the above structure preferably satisfies the below conditional expression (11), $$Fno \leq 1.8 \quad (11)$$

where Fno denotes F-number.

The conditional expression (11) defines F-number. If a pixel size of the image sensor becomes small, luminous quantity took from the imaging lens has tendency to be reduced and it becomes difficult to obtain bright image. If this problem is to be solved by increasing sensitivity at the image sensor side, there is generated noise and deterioration in image easily occurred. Therefore, it is an effective means to increase luminous quantity emitted from the imaging lens. If the conditional expression (11) is satisfied, addressing an image sensor recently densified can be available.

The imaging lens having the above structure preferably satisfies the below conditional expression (12), $$|f/f4|+|f/f5|+|f/f6|<2.8 \quad (12)$$

where f denotes a focal length of the overall optical system, f4 denotes a focal length of the fourth lens, f5 denotes a focal length of the fifth lens, f6 denotes a focal length of the sixth lens.

Conditional expression (12) defines appropriate range of a focal length of the fourth lens, fifth lens and sixth lens, respectively. When a value is above the upper limit, power of optical system of the fourth to sixth lenses becomes too large and it is not preferable that the sensitivity to the production error becomes sensitive.

DETAILED DESCRIPTION OF THE PREFERRED EMBODIMENT

Hereinafter, the preferred embodiment of the present invention will be described in detail referring to the accompanying drawings. FIGS. 1, 3, 5, 7, 9, 11 and 13 are schematic views showing the general configurations of the imaging lenses in Examples 1 to 7 according to this embodiment, respectively. Embodiment of the present invention is explained below.

As shown in each drawing, the imaging lens according to this embodiment comprises, in order from an object side to an image side, a first lens L1 having positive refractive power and a convex surface on an object side near an optical axis, a second lens L2 having at least one aspheric surface, a third lens L3 having at least one aspheric surface, a fourth lens L4 having at least one aspheric surface, a fifth lens L5 having at least one aspheric surface, a sixth lens L6 having at least one aspheric surface, a seventh lens L7 having at least one aspheric surface, and an eighth lens L8 having a concave surface on an image side near the optical axis as double-sided aspheric lens, wherein the eighth lens L8 has pole points Ph82 off an optical axis on the aspheric image-side surface.

In each embodiment, variety of selection is available such that refractive power of the second lens L2 to the eighth lens L8 is positive or negative, shape of the image-side surfaces of the first lens L1 to the seventh lens L7, respectively is a convex or concave near an optical axis, and an optimum selection is made so as to realize performance at an early stage.

More specifically, power arrangement in the embodiment 1 is, in order from an object side, + − + − + − − −, in the embodiments 2 and 3, the power arrangement is, in order from the object side, + − + − + + − −, in the embodiments 4 to 6, the power arrangement is, in order from the object side, + + − + − + − −, and in the embodiment 7, the power arrangement is, in order from the object side, + + − + + + − −. The following condition is common to all of embodiment, namely the first lens L1 has positive refractive power, and the seventh lens L7 and the eighth lens L8 have negative refractive power. Shape of each lens surface is defined through the embodiment 1 to 7 that the object-side surface of the first lens L1 and the second lens L2 are convex near the optical axis, the image-side surface of the eighth lens L8 is concave near the optical axis, the third lens L3 and the seventh lens L7 are meniscus near the optical axis.

Figure 5:
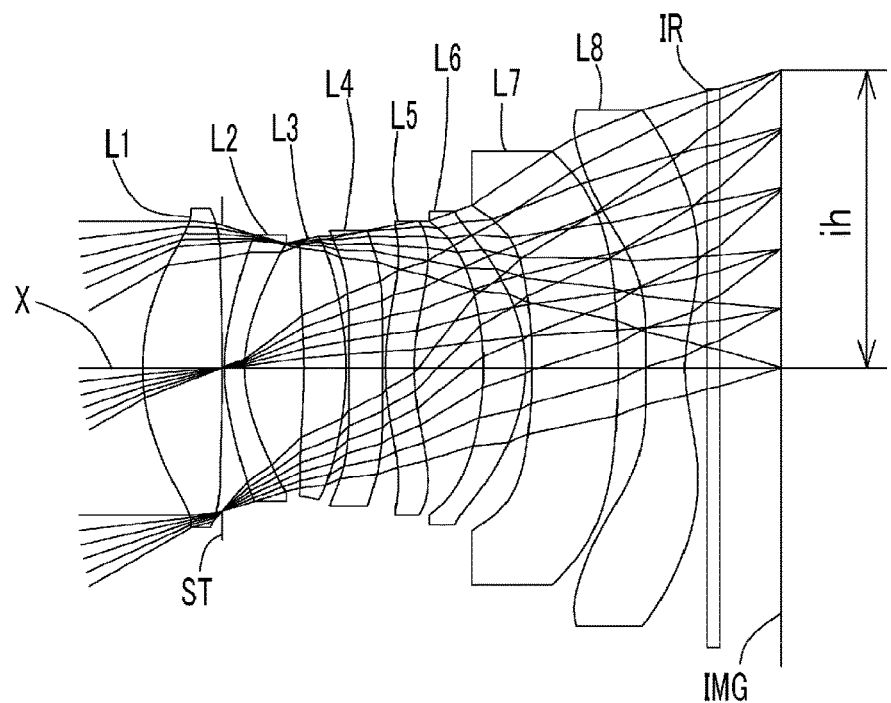
FIG. 5 is a schematic view showing the general configuration of an imaging lens in Example 3 according to the embodiment of the present invention.

An aperture stop ST is located between the first lens L1 and the second lens L2. The location of the aperture stop ST may be, as shown in FIG. 5, between the second lens L2 and the third lens L3.

A filter IR such as an IR cut filter or a cover glass is located between the eighth lens L8 and an image plane IMG. The filter IR is omissible. A point forming an image on the image plane in an optical system is variable due to thickness of the filter IR, and a distance of a direction of the optical axis according to the present invention is defined as a distance which the thickness of an optical element not involved in divergence or convergence of light is air-converted.

Figure 1:
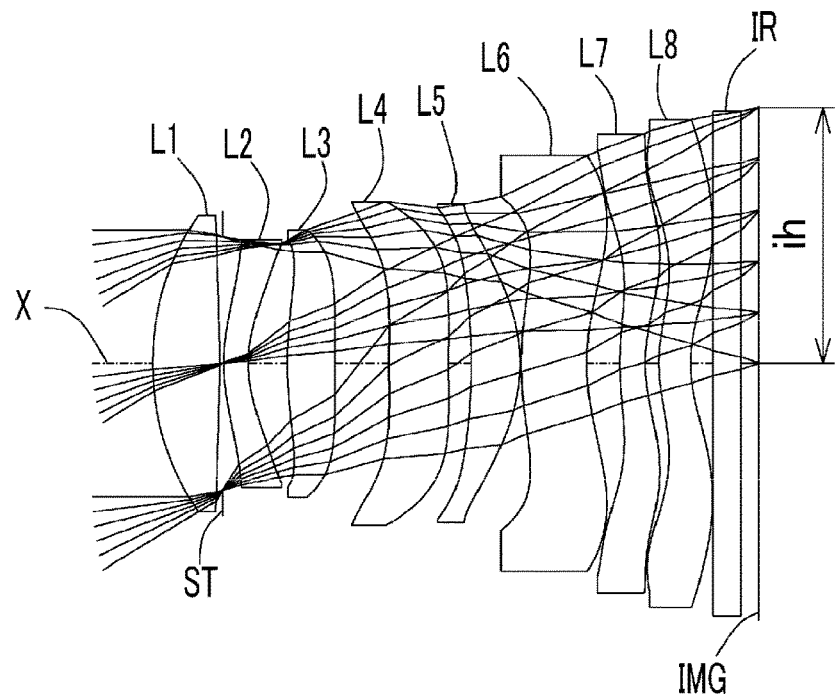
FIG. 1 is a schematic view showing the general configuration of an imaging lens in Example 1 according to an embodiment of the present invention.

Next, description of the present embodiments will be made with reference to FIG. 1.

According to the present embodiment, the first lens L1 is biconvex near the optical axis, and low-profileness can be achieved by adding strong positive refractive power. Shape of the first lens L1 is not limited to biconvex, but may be meniscus and convex surface on the object side near the optical axis as shown in the embodiment 6 in FIG. 11.

Figure 11:
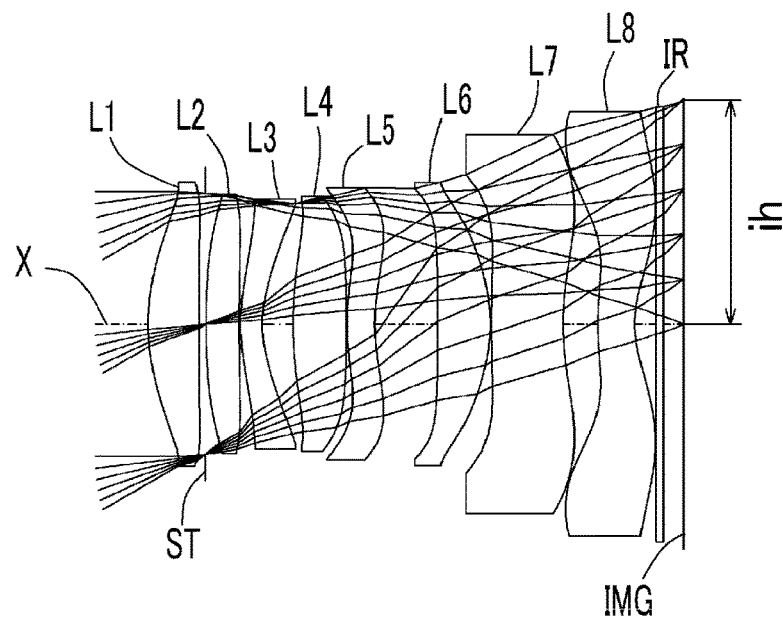
FIG. 11 is a schematic view showing the general configuration of an imaging lens in Example 6 according to the embodiment of the present invention.

The second lens L2 is meniscus and has concave surface on the image side near the optical axis, and also has negative refractive power as double-sided aspheric lens. Shape or refractive power of the second lens L2 is not limited to above. The embodiments 4, 5 and 7 shown in FIGS. 7, 9, and 13, respectively are examples having positive refractive power and biconvex surfaces near the optical axis. The embodiment 6 shown in FIG. 11 is an example of meniscus having positive refractive power and convex surface on the object side near the optical axis.

The third lens L3 is meniscus and has positive refractive power and convex surface on the object side near the optical axis as double-sided aspheric lens. Shape or refractive power of the third lens L3 is not limited to the above. As shown in the embodiments 2 and 3 in FIGS. 3 and 5, the third lens L3 may be meniscus and have a convex surface on the image side near the optical axis. The embodiments 4, 5, 6 and 7 shown in FIGS. 7, 9, 11 and 13, respectively are an example that the refractive power of the third lens L3 becomes negative.

Figure 7:
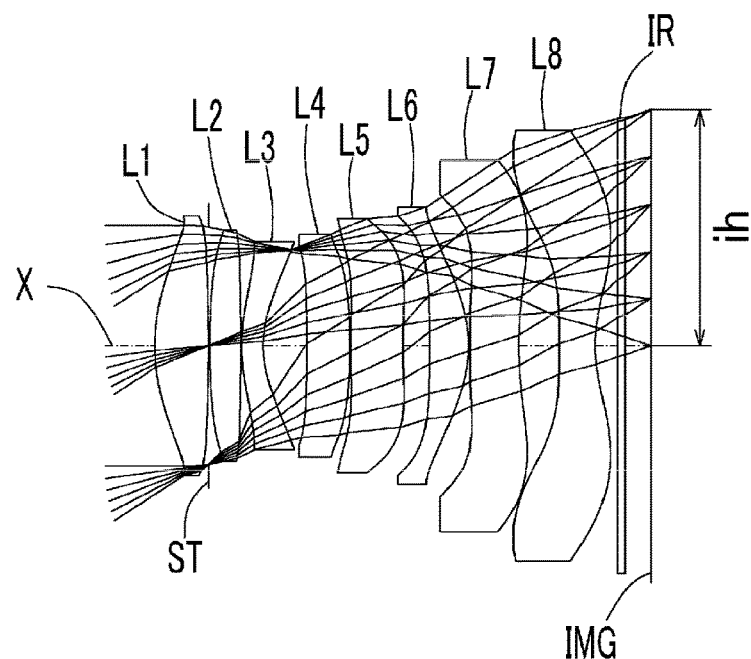
FIG. 7 is a schematic view showing the general configuration of an imaging lens in Example 4 according to the embodiment of the present invention.
Figure 9:
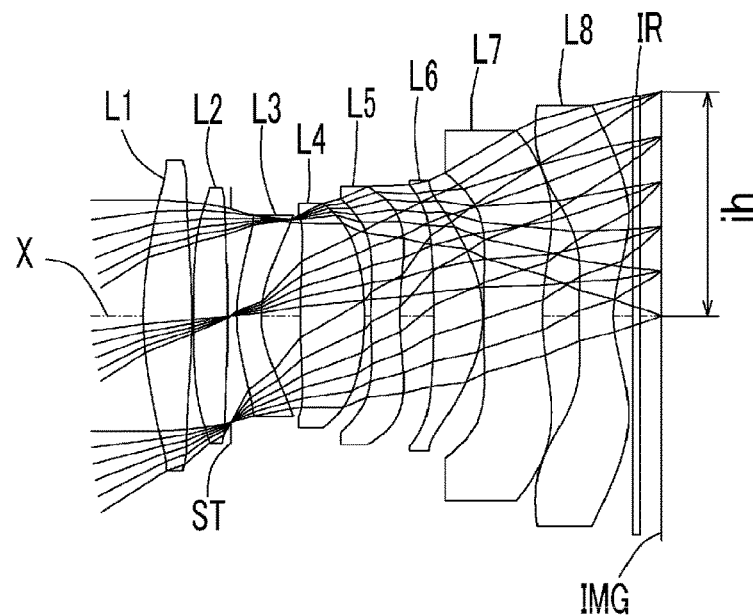
FIG. 9 is a schematic view showing the general configuration of an imaging lens in Example 5 according to the embodiment of the present invention.
Figure 13:
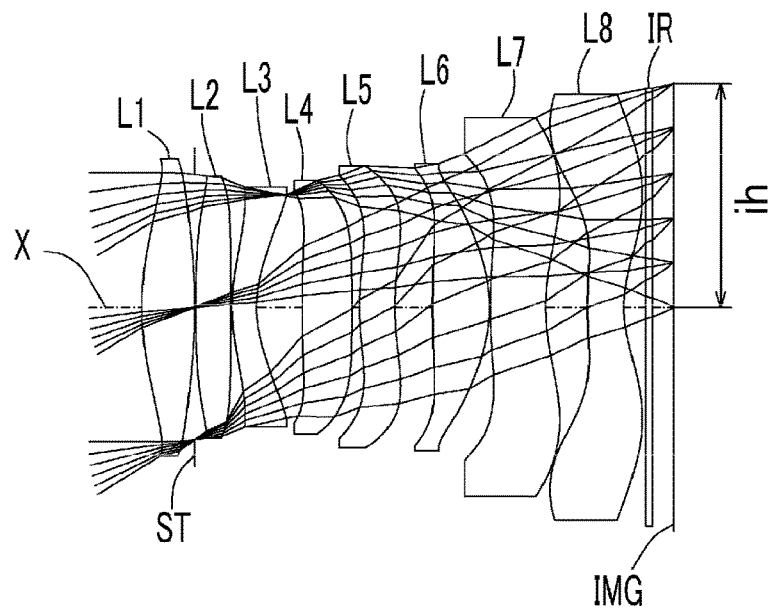
FIG. 13 is a schematic view showing the general configuration of an imaging lens in Example 7 according to the embodiment of the present invention.

The fourth lens L4 is meniscus and has negative refractive power and a concave surface on the image side near the optical axis as double-sided aspheric lens. Shape or refractive power of the fourth lens L4 is not limited to the above. The embodiment 4 shown in FIG. 7 is an example that the fourth lens is meniscus and has positive refractive power and a concave surface on the object side near the optical axis, and the embodiments 5, 6, and 7 shown in FIGS. 9, 11 and 13 is an example to have positive refractive power and a biconvex surfaces on the object and image sides near the optical axis.

The fifth lens L5 is meniscus and has positive refractive power and a concave surface on the object side near the optical axis as double-sided aspheric lens. Shape or refractive power of the fifth lens L5 is not limited to the above. As the embodiment 2 shown in FIG. 3, the fifth lens L5 may have positive refractive power and biconvex surfaces on the object and image sides near the optical axis, or as the embodiments 3 and 7 shown in FIGS. 5 and 13, may be meniscus and have positive refractive power and concave surface on the image side near the optical axis. Further, as the embodiments 4, 5 and 6 shown in FIGS. 7, 9 and 11, the fifth lens L5 may be meniscus and have negative refractive power and a concave surface on the image side near the optical axis.

The sixth lens L6 is meniscus and has negative refractive power and a concave surface on the image side near the optical axis as double-sided aspheric lens. Shape or refractive power of the sixth lens L6 is not limited to the above. The embodiments 2, 3, 4, 5 and 6 shown in FIGS. 3, 5, 7, 9 and 11 are examples being meniscus and having positive refractive power and a concave surface on the object side near the optical axis, and the embodiment 7 shown in FIG. 13 is an example having positive refractive power and biconvex surfaces on the object and image sides near the optical axis.

As mentioned, appropriate positive or negative refractive powers are provided to the second lens L2 to the sixth lens L6 and each surface is formed as aspherical, therefore various aberrations such as spherical aberrations, astigmatism, field curvature and distortion are corrected while maintaining low-profileness.

The seventh lens L7 is meniscus and has negative refractive power and a concave surface on the image side near the optical axis as double-sided aspheric lens. Shape of the seventh lens L7 is not limited to the meniscus having a concave surface on the image side near the optical axis. As the embodiments 2 and 3 shown in FIGS. 3 and 5, it may be meniscus and have a concave surface on the object side near the optical axis.

The eighth lens L8 is meniscus and has negative refractive power and a concave surface on the image side near the optical axis as double-sided aspheric lens. The aspheric surfaces formed on both side correct spherical aberrations, field curvature in a peripheral area, and distortion. The image-side surface of the eighth lens L8 has the aspherical shape having the pole points Ph82 off an optical axis, and an appropriate light ray incident angle on the image sensor IMG is provided. Shape of the eighth lens L8 is not limited to the meniscus having a concave surface on the image side near the optical axis. The embodiment 4 shown in FIG. 7 is an example to have biconcave surfaces on the object and image sides near the optical axis.

According to the imaging lens having the above structure, if the first lens L1 to sixth lens L6 are grouped as a front group, composite refractive power of the front group is positive, and if the seventh lens L7 and eighth lens L8 are grouped as a rear group, composite refractive power of the rear group is negative. Using such refractive power distribution, telephoto properties can be maintained.

The imaging lens according to the present embodiments adopts plastic materials to all of lenses, therefore manufacturing becomes easy and mass-production is available at low cost. Furthermore, aspherical surfaces are formed on both sides of all lenses and aberrations are properly corrected.

Note that the material adopted to the lens is not limited to the plastic material. If glass material having a large power is used for the lenses, it becomes possible to suppress deterioration in the image caused by movement of an image accompanying change of an atmospheric temperature and further high-performance may be aimed. All of surfaces of lenses are preferably formed as aspherical, however, spherical surfaces may be adopted which is easy to manufacture in accordance with required performance.

The imaging lens according to the present embodiments shows preferable effect by satisfying the below conditional expressions (1) to (12).

$$0.5 < \Sigma d/f < 2.1 \tag{1}$$

$$0.1 < Ph82/ih < 0.9 \tag{2}$$

$$0.3 < |r13/r14| < 4.9 \tag{3}$$

$$0.2 < r16/f < 0.8 \tag{4}$$

$$0.4 < |f/f7| + |f/f8| < 2.2 \tag{5}$$

$$15 < vd8 - vd7 < 52 \tag{6}$$

$$f123/f < 3.5 \tag{7}$$

$$-1.9 < f/f8 < -0.07 \tag{8}$$

$$0.6 < TTL/2ih < 1.3 \tag{9}$$

$$0.5 < ih/f < 0.9 \tag{10}$$

$$Fno \leq 1.8 \tag{11}$$

$$|f/f4| + f/f5| + |f/f6| < 2.8 \tag{12}$$

where

Σd: a distance on an optical axis X from the object-side surface of a first lens to the image-side surface of the eighth lens Ph82: a height perpendicular to the optical axis X of the pole point formed on an image-side surface of the eighth lens ih: maximum image height f: a focal length of the overall optical system f4: a focal length of the fourth lens L4 f5: a focal length of the fifth lens L5 f6: a focal length of the sixth lens L6 f7: a focal length of the seventh lens L7 f8: a focal length of the eighth lens L8 f123: a composite focal length of the first, second and third lenses r13: curvature radius near an optical axis of the object-side surface of the seventh lens L7 r14: curvature radius near an optical axis of the image-side surface of the seventh lens L7 r16: curvature radius near an optical axis of the image-side surface of the eighth lens L8

Fno: F-number vd7: abbe number at d-ray of the seventh lens L7 vd8: abbe number at d-ray of the eighth lens L8

TTL: total track length.

Furthermore, the imaging lens according to the present embodiments shows preferable effect by satisfying the below conditional expressions (1a) to (12a).

$0.77 < \Sigma d/f < 1.74$ (1a)

$0.24 < Ph82/ih < 0.72$ (2a)

$0.45 < |r13/r14| < 4.08$ (3a)

$0.28 < r16/f < 0.65$ (4a)

$0.6 < |f/f7| + f/f8| < 1.81$ (5a)

$23 < vd8 - vd7 < 43$ (6a)

$f123/f < 2.91$ (7a)

$-1.59 < f/f8 < -0.1$ (8a)

$0.77 < TTL/2ih < 1.19$ (9a)

$0.57 < ih/f < 0.81$ (10a)

$1.0 \leq Fno \leq 1.8$ (11a)

$|f/f4| + |f/f5| + |f/f6| < 2.32$ (12a)

The signs in the above conditional expressions have the same meanings as those in the paragraph before the preceding paragraph.

Additionally, the imaging lens according to the present embodiments shows more preferable effect by satisfying the below conditional expressions (1b) to (10b), and (12b).

$0.915 \Sigma d/f < 1.56$ (1b)

$0.31 \leq Ph82/ih \leq 0.63$ (2b)

$0.52 \leq r13/r14 \leq 3.67$ (3b)

$0.32 \leq r16/f \leq 0.57$ (4b)

$0.7 \leq |f/f7| + |f/f8| \leq 1.62$ (5b)

$26 < vd8 - vd7 < 39$ (6b)

$f123/f \leq 2.61$ (7b)

$-1.43 \leq f/f8 \leq -0.12$ (8b)

$0.86 \leq TTL/2ih \leq 1.14$ (9b)

$0.60 \leq ih/f \leq 0.77$ (10b)

$|f/f4| + |f/f5| + |f/f6| \leq 2.08$ (12b)

The signs in the above conditional expressions have the same meanings as those in the paragraph before the preceding paragraph.

Figure 15:
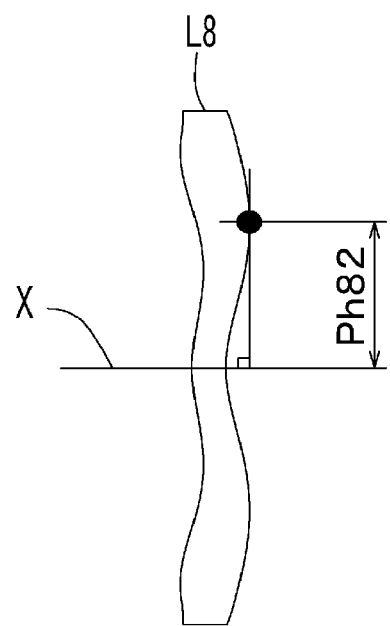
FIG. 15 shows a view showing height Ph82 perpendicular to the optical axis of the pole point formed on an image-side surface of the eighth lens according to the eighth lens of the image sensor related to the present invention.

FIG. 15 shows points of parameter Ph82 in the conditional expressions (2), (2a) and (2b). As shown in FIG. 15, the pole point Ph82 formed on the image-side surface of the eighth lens L8 is defined as an off-axial point on an aspheric surface at which a tangential plane intersects the optical axis X perpendicularly.

The aspheric shapes of these lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

Next, examples of the imaging lens according to this embodiment will be explained. In each example, f denotes the focal length of the overall optical system of the imaging lens, Fno denotes an F-number, ⍵ denotes a half field of view. Additionally, i denotes surface number counted from the object side, r denotes a curvature radius, d denotes the distance of lenses on the optical axis (surface distance), Nd denotes a refractive index at d-ray (reference wavelength), and vd denotes an Abbe number at d-ray. As for aspheric surfaces, an asterisk (*) is added after surface number i.

Example 1

TABLE 1

Unit [mm]

f = 11.68
Fno = 1.4
⍵ (°) = 33.7

Surface Data

| Surface Number i | Curvature Radius r | Surface Distance d | Refractive Index Nd | Abbe Number vd |
|---|---|---|---|---|
| (Object) | Infinity | Infinity | | |
| 1* | 9.753 | 1.900 | 1.5443 | 55.86 (=vd1) |
| 2* | −44.764 | 0.097 | | |
| 3 (Stop) | Infinity | 0.030 | | |
| 4* | 6.390 | 0.697 | 1.6503 | 21.54 (=vd2) |
| 5* | 4.407 | 1.119 | | |
| 6* | 14.111 | 1.343 | 1.5348 | 55.66 (=vd3) |
| 7* | 66.576 | 1.559 | | |
| 8* | 73.582 | 1.714 | 1.5348 | 55.66 (=vd4) |
| 9* | 67.528 | 0.645 | | |
| 10* | −21.307 | 1.393 | 1.5443 | 55.86 (=vd5) |
| 11* | −5.897 | 0.022 | | |
| 12* | 12.113 | 1.873 | 1.6503 | 21.54 (=vd6) |
| 13* | 8.925 | 0.935 | | |

TABLE 1-continued

Unit [mm]

| | | | | |
|---|---|---|---|---|
| 14* | 10.383 (=r13) | 0.725 | 1.6503 | 21.54 (=vd7) |
| 15* | 5.263 (=r14) | 0.381 | | |
| 16* | 5.002 | 0.918 | 1.5348 | 55.66 (=vd8) |
| 17* | 4.227 (=r16) | 0.660 | | |
| 18 | Infinity | 0.800 | 1.5168 | 64.20 |
| 19 | Infinity | 0.503 | | |
| Image Plane | Infinity | | | |

| Constituent Lens Data | | | Composite Focal Length | |
|---|---|---|---|---|
| Lens | Start Surface | Focal Length | Lens | Focal Length |
| 1 | 1 | 14.90 | 1, 2, 3 | 16.74 |
| 2 | 4 | −25.35 | | |
| 3 | 6 | 33.19 | | |
| 4 | 8 | −1702.49 | | |
| 5 | 10 | 14.52 | | |
| 6 | 12 | −67.86 | | |
| 7 | 14 | −17.38 | | |
| 8 | 16 | −86.89 | | |

Aspheric Surface data

| | First Surface | Second Surface | Fourth Surface | Fifth Surface | Sixth Surface | Seventh Surface | Eighth Surface | Ninth Surface |
|---|---|---|---|---|---|---|---|---|
| k | 0.000E+00 | 0.000E+00 | 0.000E+00 | 0.000E+00 | 0.000E+00 | 0.000E+00 | 0.000E+00 | 0.000E+00 |
| A4 | 5.072E−04 | 3.442E−04 | −6.434E−03 | −8.339E−03 | −1.196E−03 | −2.194E−03 | −2.873E−03 | −2.525E−03 |
| A6 | −4.305E−05 | 1.779E−05 | 4.044E−04 | 4.662E−04 | −3.742E−05 | −7.404E−07 | −1.631E−05 | −1.271E−05 |
| A8 | 2.860E−06 | −1.518E−06 | −2.178E−05 | −2.978E−05 | 3.490E−06 | −6.546E−07 | 2.138E−06 | −2.625E−07 |
| A10 | −6.362E−08 | 2.437E−08 | 4.977E−07 | 8.280E−07 | −4.032E−07 | −1.138E−07 | 0.000E+00 | 0.000E+00 |
| A12 | 0.000E+00 | 0.000E+00 | 0.000E+00 | −1.185E−08 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 | 0.000E+00 |

| | Tenth Surface | Eleventh Surface | Twelfth Surface | Thirteenth Surface | Fourteenth Surface | Fifteenth Surface | Sixteenth Surface | Seventeenth Surface |
|---|---|---|---|---|---|---|---|---|
| k | 0.000E+00 | −4.857E−01 | 0.000E+00 | 0.000E+00 | 0.000E+00 | −6.680E+00 | −1.215E+01 | −7.779E+00 |
| A4 | −3.847E−04 | 9.510E−05 | −1.359E−03 | −3.401E−04 | −4.966E−04 | −3.832E−03 | −4.134E−03 | −2.513E−03 |
| A6 | 8.615E−05 | 1.348E−04 | 2.994E−05 | −1.744E−04 | 6.239E−05 | 1.186E−04 | 1.323E−04 | 9.012E−05 |
| A8 | −8.016E−06 | −8.071E−06 | −1.198E−05 | 1.033E−05 | 4.058E−06 | −2.411E−06 | −2.545E−06 | −2.544E−06 |
| A10 | 1.611E−07 | 1.792E−07 | 8.770E−07 | −3.467E−07 | −1.593E−07 | 4.486E−08 | 4.418E−08 | 4.820E−08 |
| A12 | 0.000E+00 | 0.000E+00 | −2.910E−08 | 7.165E−09 | 2.270E−09 | −4.991E−10 | −4.917E−10 | −4.812E−10 |
| A14 | 0.000E+00 | 0.000E+00 | 3.573E−10 | −8.677E−11 | −1.419E−11 | 1.810E−12 | 2.044E−12 | 1.817E−12 |
| A16 | 0.000E+00 | 0.000E+00 | 0.000E+00 | 4.750E−13 | 2.797E−14 | 0.000E+00 | 0.000E+00 | 0.000E+00 |

Basic lens data are shown in below Table 1.

The imaging lens in Example 1 satisfies all of conditional expressions (1) to (12) as shown in Table 8.

Figure 2:
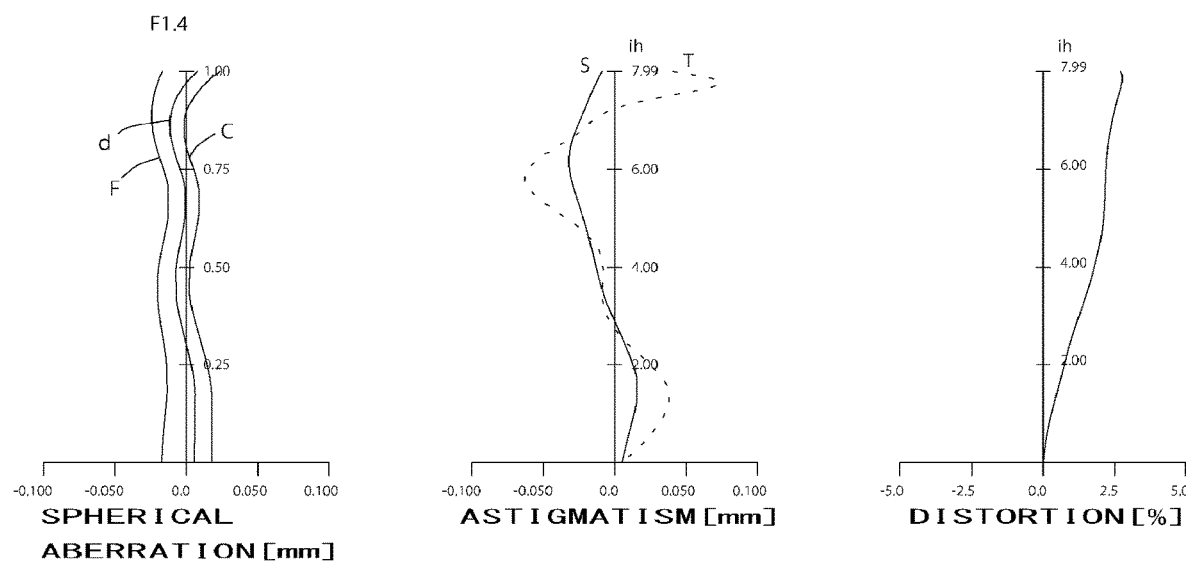
FIG. 2 shows spherical aberration, astigmatism, and distortion of the imaging lens in Example 1 according to the embodiment of the present invention.
Figure 3:
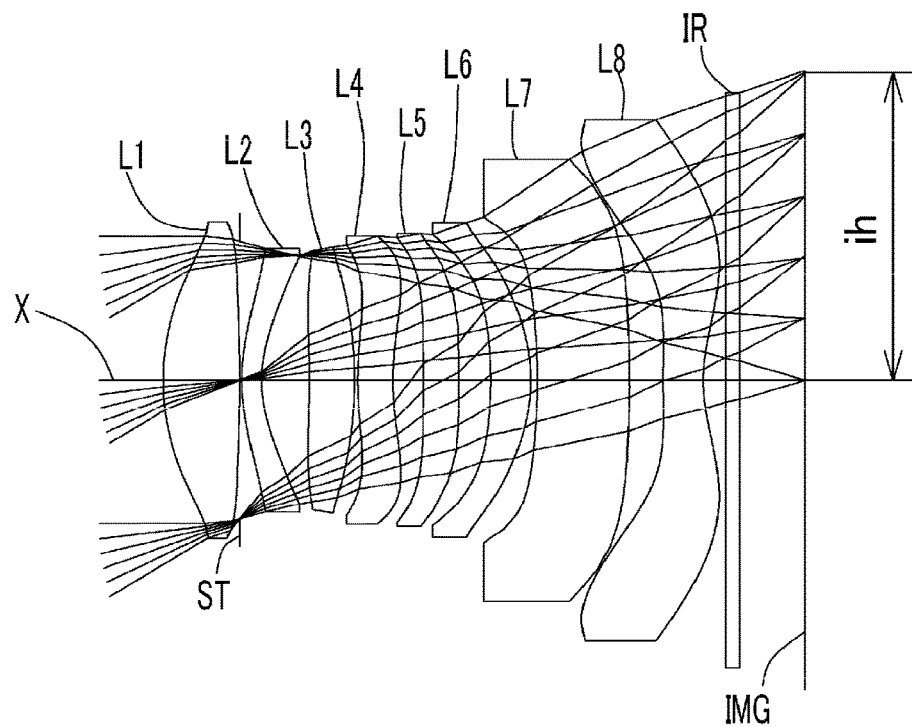
FIG. 3 is a schematic view showing the general configuration of an imaging lens in Example 2 according to the embodiment of the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram and distortion diagram show the amount of aberration at d-ray. The astigmatism diagram shows sagittal image surface S and the amount of aberration t d-ray on tangential image surface T (same as in FIGS. 4, 6, 8, 10, 12, and 14). As shown in FIG. 2, each aberration is corrected properly.

Example 2

Basic lens data are shown in below Table 2.

TABLE 2

Unit [mm]

f = 7.75
Fno = 1.6
ω (°) = 33.0

Surface Data

| Surface Number i | Curvature Radius r | Surface Distance d | Refractive Index Nd | Abbe Number vd |
|---|---|---|---|---|
| (Object) | Infinity | Infinity | | |
| 1* | 4.183 | 1.150 | 1.5443 | 55.86 (=vd1) |
| 2* | −25.354 | 0.000 | | |
| 3 (Stop) | Infinity | 0.030 | | |

TABLE 2-continued

| | Unit [mm] | | | |
|---|---|---|---|---|
| 4* | 3.355 | 0.300 | 1.6503 | 21.54 (=vd2) |
| 5* | 2.365 | 0.711 | | |
| 6* | −26.314 | 0.682 | 1.5348 | 55.66 (=vd3) |
| 7* | −7.335 | 0.050 | | |
| 8* | 6.662 | 0.525 | 1.5348 | 55.66 (=vd4) |
| 9* | 5.296 | 0.458 | | |
| 10* | 253.193 | 0.539 | 1.5348 | 55.66 (=vd5) |
| 11* | −111.646 | 0.483 | | |
| 12* | −7.804 | 0.600 | 1.5443 | 55.86 (=vd6) |
| 13* | −3.067 | 0.100 | | |
| 14* | −10.030 (=r13) | 1.378 | 1.6503 | 21.54 (=vd7) |
| 15* | −16.894 (=r14) | 0.506 | | |
| 16* | 23.658 | 0.600 | 1.5348 | 55.66 (=vd8) |
| 17* | 2.901 (=r16) | 0.340 | | |
| 18 | Infinity | 0.210 | 1.5168 | 64.20 |
| 19 | Infinity | 0.990 | | |
| Image Plane | Infinity | | | |

| Constituent Lens Data | | | Composite Focal Length | |
|---|---|---|---|---|
| Lens | Start Surface | Focal Length | Lens | Focal Length |
| 1 | 1 | 6.69 | 1, 2, 3 | 7.63 |
| 2 | 4 | −14.00 | | |
| 3 | 6 | 18.78 | | |
| 4 | 8 | −55.78 | | |
| 5 | 10 | 144.95 | | |
| 6 | 12 | 8.89 | | |
| 7 | 14 | −41.22 | | |
| 8 | 16 | −6.25 | | |

Aspheric Surface data

| | First Surface | Second Surface | Fourth Surface | Fifth Surface | Sixth Surface | Seventh Surface | Eighth Surface | Ninth Surface |
|---|---|---|---|---|---|---|---|---|
| k | 0.000E+00 | 0.000E+00 | 0.000E+00 | 0.000E+00 | 0.000E+00 | 0.000E+00 | 0.000E+00 | 0.000E+00 |
| A4 | 8.793E−04 | 2.599E−03 | −4.097E−02 | −5.283E−02 | 7.952E−03 | −1.583E−03 | −2.056E−02 | −1.496E−02 |
| A6 | −1.165E−03 | 1.321E−04 | 1.088E−02 | 1.271E−02 | −1.637E−03 | 3.089E−04 | −9.921E−04 | −1.479E−03 |
| A8 | 2.353E−04 | −1.247E−04 | −2.047E−03 | −3.129E−03 | 6.994E−04 | 2.398E−05 | 1.162E−04 | −6.081E−05 |
| A10 | −2.895E−05 | 3.136E−06 | 1.494E−04 | 4.074E−04 | −8.636E−05 | 0.000E+00 | 0.000E+00 | 0.000E+00 |
| A12 | 0.000E+00 | 0.000E+00 | 0.000E+00 | −3.393E−05 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 | 0.000E+00 |

| | Tenth Surface | Eleventh Surface | Twelfth Surface | Thirteenth Surface | Fourteenth Surface | Fifteenth Surface | Sixteenth Surface | Seventeenth Surface |
|---|---|---|---|---|---|---|---|---|
| k | 0.000E+00 | 0.000E+00 | 0.000E+00 | −1.747E+00 | 0.000E+00 | 0.000E+00 | 0.000E+11 | −6.553E+00 |
| A4 | −1.407E−02 | −1.929E−02 | −1.121E−02 | 2.214E−03 | 5.277E−03 | 1.003E−02 | −3.113E−02 | −2.250E−02 |
| A6 | 2.758E−03 | −3.824E−04 | −6.418E−04 | 1.127E−03 | 4.946E−04 | −4.494E−03 | 1.036E−03 | 2.651E−03 |
| A8 | −8.920E−04 | 1.511E−04 | −2.679E−05 | −6.564E−04 | −1.233E−03 | 9.010E−04 | 3.938E−04 | −2.410E−04 |
| A10 | 7.522E−05 | 0.000E+00 | 0.000E+00 | 6.646E−05 | 2.977E−04 | −1.145E−04 | −5.178E−05 | 1.448E−05 |
| A12 | 0.000E+00 | 0.000E+00 | 0.000E+00 | 0.000E+00 | −3.550E−05 | 8.797E−06 | 2.672E−06 | −4.749E−07 |
| A14 | 0.000E+00 | 0.000E+00 | 0.000E+00 | 0.000E+00 | 1.580E−06 | −3.790E−07 | −5.858E−08 | 6.350E−09 |
| A16 | 0.000E+00 | 0.000E+00 | 0.000E+00 | 0.000E+00 | 0.000E+00 | 7.107E−09 | 3.590E−09 | 0.000E+00 |

The imaging lens in Example 2 satisfies all of conditional expressions (1) to (12) as shown in Table 8.

Figure 4:
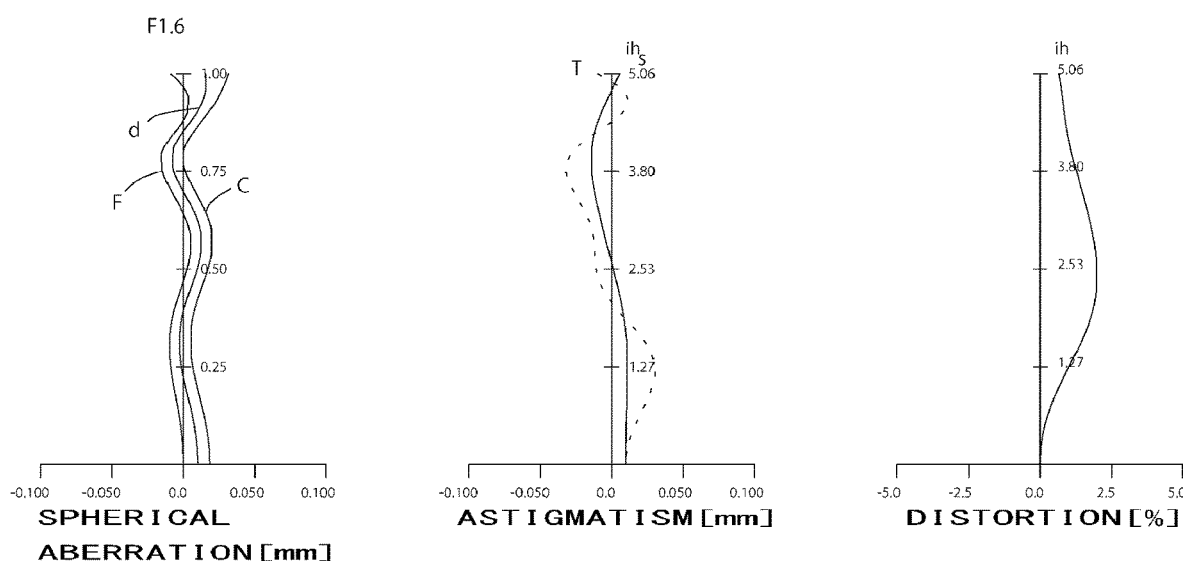
FIG. 4 shows spherical aberration, astigmatism, and distortion of the imaging lens in Example 2 according to the embodiment of the present invention.

FIG. 4 shows spherical aberration (mm), astigmatism (mm), and distortion (%) of the imaging lens in Example 2. As shown in FIG. 4, each aberration is corrected properly.

Example 3

Basic lens data are shown in below Table 3.

TABLE 3

Unit [mm]

f = 8.04
Fno = 1.6
ω (°) = 32.0

Surface Data

| Surface Number i | Curvature Radius r | Surface Distance d | Refractive Index Nd | Abbe Number νd |
|---|---|---|---|---|
| (Object) | Infinity | Infinity | | |
| 1* | 4.103 | 1.230 | 1.5443 | 55.86 (=νd1) |
| 2* | −27.753 | 0.000 | | |
| 3 (Stop) | Infinity | 0.030 | | |
| 4* | 3.369 | 0.309 | 1.6503 | 21.54 (=νd2) |
| 5* | 2.381 | 0.929 | | |
| 6* | −11.320 | 0.646 | 1.5348 | 55.66 (=νd3) |
| 7* | −5.835 | 0.050 | | |
| 8* | 81.765 | 0.510 | 1.6503 | 21.54 (=νd4) |
| 9* | 30.782 | 0.050 | | |
| 10* | 4.661 | 0.449 | 1.5348 | 55.66 (=νd5) |
| 11* | 4.790 | 1.077 | | |
| 12* | −5.899 | 0.652 | 1.5443 | 55.86 (=νd6) |
| 13* | −2.951 | 0.100 | | |
| 14* | −10.761 (=r13) | 1.333 | 1.6142 | 25.58 (=νd7) |
| 15* | −13.519 (=r14) | 0.429 | | |
| 16* | 121.143 | 0.600 | 1.5348 | 55.66 (=νd8) |
| 17* | 3.270 (=r16) | 0.340 | | |
| 18 | Infinity | 0.210 | 1.5168 | 64.20 |
| 19 | Infinity | 0.964 | | |
| Image Plane | Infinity | | | |

| Constituent Lens Data | | | Composite Focal Length | |
|---|---|---|---|---|
| Lens | Start Surface | Focal Length | Lens | Focal Length |
| 1 | 1 | 6.66 | 1, 2, 3 | 7.94 |
| 2 | 4 | −14.23 | | |
| 3 | 6 | 21.63 | | |
| 4 | 8 | −76.21 | | |
| 5 | 10 | 146.22 | | |
| 6 | 12 | 10.06 | | |
| 7 | 14 | −105.20 | | |
| 8 | 16 | −6.29 | | |

Aspheric Surface data

| | First Surface | Second Surface | Fourth Surface | Fifth Surface | Sixth Surface | Seventh Surface | Eighth Surface | Ninth Surface |
|---|---|---|---|---|---|---|---|---|
| k | 0.000E+00 | 0.000E+00 | 0.000E+00 | 0.000E+00 | 0.000E+00 | 0.000E+00 | 0.000E+00 | 0.000E+00 |
| A4 | 1.327E−03 | 2.083E−03 | −3.974E−02 | −5.096E−02 | 1.086E−02 | 2.907E−03 | −1.442E−02 | −1.144E−02 |
| A6 | −1.199E−03 | 7.487E−04 | 1.139E−02 | 1.304E−02 | −2.093E−03 | 7.891E−04 | 2.008E−03 | −7.330E−04 |
| A8 | 2.627E−04 | −2.155E−04 | −2.023E−03 | −3.178E−03 | 7.399E−04 | −2.408E−04 | −7.997E−04 | 1.653E−04 |
| A10 | −2.953E−05 | 7.596E−06 | 1.416E−04 | 4.242E−04 | −1.091E−04 | 0.000E+00 | 9.894E−05 | 0.000E+00 |
| A12 | 0.000E+00 | 0.000E+00 | 0.000E+00 | −3.415E−05 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 | 0.000E+00 |

| | Tenth Surface | Eleventh Surface | Twelfth Surface | Thirteenth Surface | Fourteenth Surface | Fifteenth Surface | Sixteenth Surface | Seventeenth Surface |
|---|---|---|---|---|---|---|---|---|
| k | 5.757E−01 | 4.969E−01 | 3.360E−01 | −1.856E+00 | 0.000E+00 | 0.000E+00 | 0.000E+00 | −7.683E+00 |
| A4 | −1.515E−02 | −1.257E−02 | −3.038E−03 | −2.535E−03 | −5.949E−04 | 8.085E−03 | −2.818E−02 | −2.148E−02 |
| A6 | −8.900E−04 | −3.900E−04 | 6.876E−04 | 1.438E−03 | 1.497E−03 | −4.226E−03 | 1.107E−03 | 2.688E−03 |
| A8 | 1.139E−04 | −5.921E−05 | −2.187E−04 | −5.375E−04 | −1.256E−03 | 8.919E−04 | 3.887E−04 | −2.418E−04 |
| A10 | 0.000E+00 | 0.000E+00 | 0.000E+00 | 5.146E−05 | 2.933E−04 | −1.147E−04 | −5.223E−05 | 1.434E−05 |
| A12 | 0.000E+00 | 0.000E+00 | 0.000E+00 | 0.000E+00 | −3.619E−05 | 8.832E−06 | 2.664E−06 | −4.769E−07 |

TABLE 3-continued

Unit [mm]

| | | | | | | | |
|---|---|---|---|---|---|---|---|
| A14 | 0.000E+00 | 0.000E+00 | 0.000E+00 | 0.000E+00 | 1.731E−06 | 3.784E−07 | 5.801E−08 | 6.549E−09 |
| A16 | 0.000E+00 | 0.000E+00 | 0.000E+00 | 0.000E+00 | 0.000E+00 | 6.966E−09 | 3.891E−10 | 0.000E+00 |

The imaging lens in Example 3 satisfies all of conditional expressions (1) to (12) as shown in Table 8.

Figure 6:
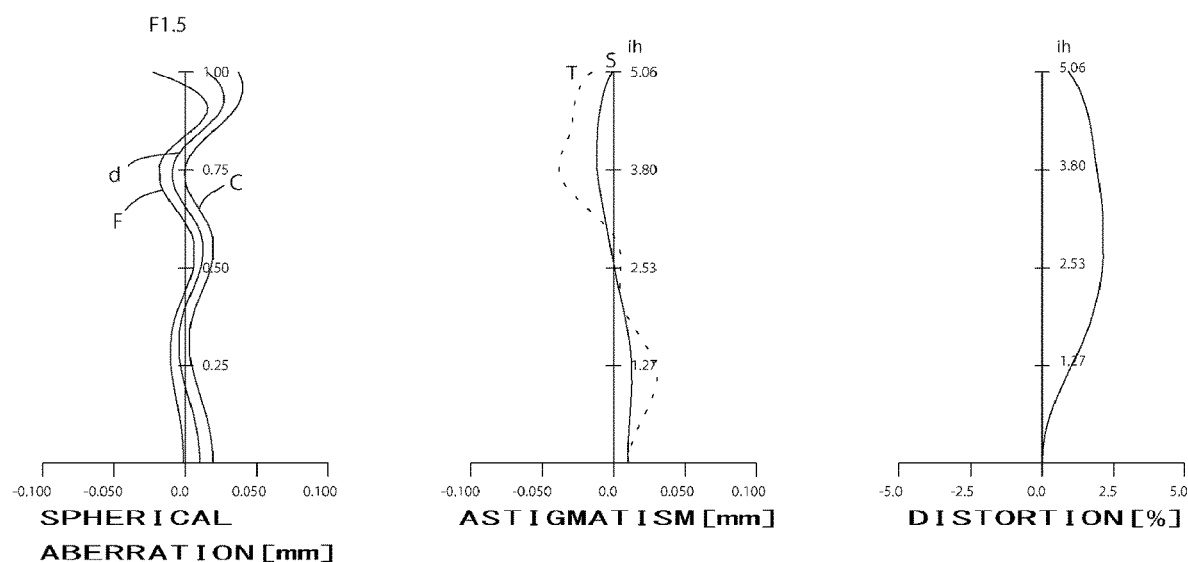
FIG. 6 shows spherical aberration, astigmatism, and distortion of the imaging lens in Example 3 according to the embodiment of the present invention.

FIG. 6 shows spherical aberration (mm), astigmatism (mm), and distortion (%) of the imaging lens in Example 3. As shown in FIG. 6, each aberration is corrected properly.

Example 4

Basic lens data are shown in below Table 4.

TABLE 4

Unit [mm]

f = 9.62
Fno = 1.4
ω (°) = 35.4

Surface Data

| Surface Number i | Curvature Radius r | Surface Distance d | Refractive Index Nd | Abbe Number νd |
|---|---|---|---|---|
| (Object) | Infinity | Infinity | | |
| 1* | 6.654 | 1.440 | 1.5443 | 55.86 (=νd1) |
| 2* | −52.527 | 0.007 | | |
| 3 (Stop) | Infinity | 0.030 | | |
| 4* | 28.912 | 0.842 | 1.5348 | 55.66 (=νd2) |
| 5* | −118.994 | 0.025 | | |
| 6* | 5.861 | 0.582 | 1.6503 | 21.54 (=νd3) |
| 7* | 3.611 | 1.180 | | |
| 8* | −56.607 | 1.153 | 1.5348 | 55.66 (=νd4) |
| 9* | −20.090 | 0.030 | | |
| 10* | 29.194 | 1.420 | 1.5348 | 55.66 (=νd5) |
| 11* | 20.931 | 0.717 | | |
| 12* | −71.271 | 1.060 | 1.5443 | 55.86 (=νd6) |
| 13* | −4.273 | 0.030 | | |
| 14* | 39.334 (=r13) | 1.314 | 1.6142 | 25.58 (=νd7) |
| 15* | 12.785 (=r14) | 1.091 | | |
| 16* | −596.915 | 0.976 | 1.5348 | 55.66 (=νd8) |
| 17* | 4.724 (=r16) | 0.600 | | |
| 18 | Infinity | 0.210 | 1.5168 | 64.20 |
| 19 | Infinity | 0.707 | | |
| Image Plane | Infinity | | | |

| Constituent Lens Data | | | Composite Focal Length | |
|---|---|---|---|---|
| Lens | Start Surface | Focal Length | Lens | Focal Length |
| 1 | 1 | 10.94 | 1, 2, 3 | 16.12 |
| 2 | 4 | 43.58 | | |
| 3 | 6 | −16.11 | | |
| 4 | 8 | 57.60 | | |
| 5 | 10 | −147.07 | | |
| 6 | 12 | 8.30 | | |
| 7 | 14 | −31.43 | | |
| 8 | 16 | −8.76 | | |

Aspheric Surface data

| | First Surface | Second Surface | Fourth Surface | Fifth Surface | Sixth Surface | Seventh Surface | Eighth Surface | Ninth Surface |
|---|---|---|---|---|---|---|---|---|
| k | 0.000E+00 | 0.000E+00 | 0.000E+00 | 0.000E+00 | 0.000E+00 | 0.000E+00 | 0.000E+00 | 0.000E+00 |
| A4 | −3.044E−04 | 3.227E−05 | 9.688E−04 | 1.467E−04 | −1.060E−02 | −1.329E−02 | 7.142E−04 | −1.174E−03 |
| A6 | −1.134E−04 | 5.863E−05 | 8.367E−06 | −5.099E−06 | 1.133E−03 | 1.165E−03 | −4.235E−04 | −2.137E−04 |
| A8 | 7.029E−06 | −4.682E−06 | 6.253E−06 | −7.302E−06 | −9.659E−05 | −1.134E−04 | 2.352E−05 | −7.893E−06 |
| A10 | −5.055E−07 | −1.102E−07 | −3.811E−07 | 2.230E−07 | 3.085E−06 | 4.749E−06 | −1.274E−06 | 1.974E−06 |

TABLE 4-continued

| | | | | Unit [mm] | | | | |
|---|---|---|---|---|---|---|---|---|
| A12 | 0.000E+00 | 0.000E+00 | 0.000E+00 | 0.000E+00 | 0.000E+00 | −1.938E−07 | 0.000E+00 | 0.000E+00 |
| A14 | 0.000E+00 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 | 0.000E+00 |

| | Tenth Surface | Eleventh Surface | Twelfth Surface | Thirteenth Surface | Fourteenth Surface | Fifteenth Surface | Sixteenth Surface | Seventeenth Surface |
|---|---|---|---|---|---|---|---|---|
| k | 0.000E+00 | 0.000E+00 | 0.000E+00 | −2.212E+00 | 0.000E+00 | 0.000E+00 | 0.000E+00 | −6.517E+00 |
| A4 | −5.103E−03 | −5.227E−03 | −2.272E−03 | 1.136E−03 | 2.994E−04 | 3.755E−04 | −6.789E−03 | −5.093E−03 |
| A6 | 4.127E−06 | −1.359E−04 | 2.129E−04 | 1.929E−04 | −6.053E−05 | −4.308E−04 | 1.284E−04 | 2.558E−04 |
| A8 | 1.013E−05 | 2.546E−06 | −3.919E−05 | −2.471E−05 | −4.085E−05 | 3.645E−05 | 1.574E−05 | −9.904E−06 |
| A10 | 0.000E+00 | 0.000E+00 | 1.324E−06 | 8.844E−07 | 5.056E−06 | −1.847E−06 | −8.775E−07 | 2.414E−07 |
| A12 | 0.000E+00 | 0.000E+00 | 0.000E+00 | 0.000E+00 | −2.651E−07 | 5.787E−08 | 1.751E−08 | −3.223E−09 |
| A14 | 0.000E+00 | 0.000E+00 | 0.000E+00 | 0.000E+00 | 5.185E−09 | −1.028E−09 | −1.262E−10 | 1.835E−11 |
| A16 | 0.000E+00 | 0.000E+00 | 0.000E+00 | 0.000E+00 | 0.000E+00 | 7.869E−12 | 0.000E+00 | 0.000E+00 |

The imaging lens in Example 4 satisfies all of conditional expressions (1) to (12) as shown in Table 8.

Figure 8:
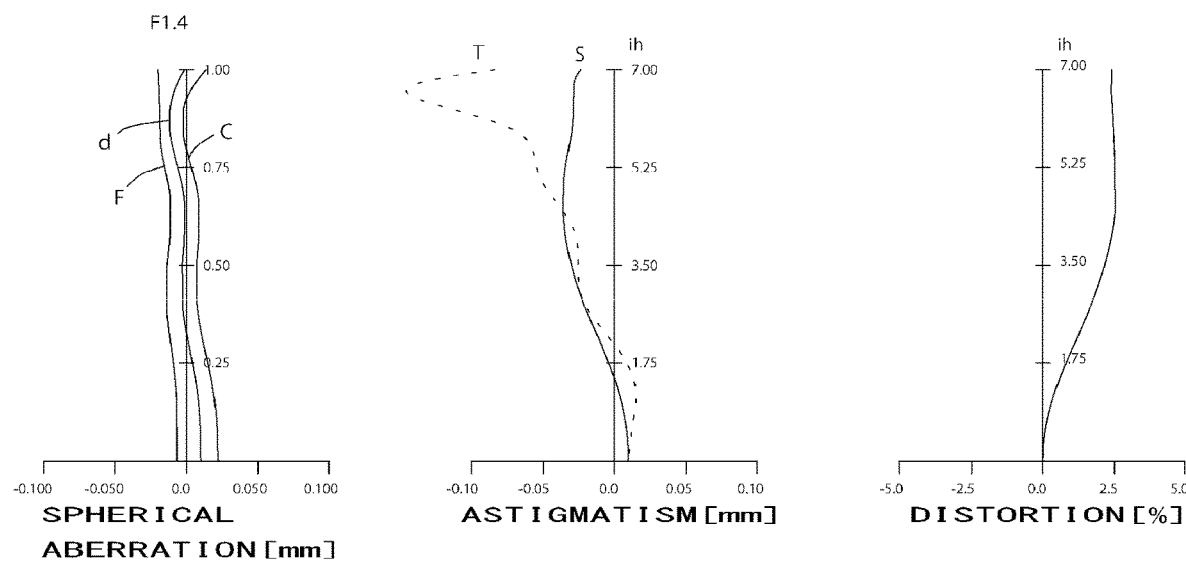
FIG. 8 shows spherical aberration, astigmatism, and distortion of the imaging lens in Example 4 according to the embodiment of the present invention.

FIG. 8 shows spherical aberration (mm), astigmatism (mm), and distortion (%) of the imaging lens in Example 4. As shown in FIG. 8, each aberration is corrected properly.

Example 5

Basic lens data are shown in below Table 5.

TABLE 5

Unit [mm]

F = 9.76
Fno = 1.4
ω (°) = 35.0

Surface Data

| Surface Number i | Curvature Radius r | Surface Distance d | Refractive Index Nd | Abbe Number νd |
|---|---|---|---|---|
| (Object) | Infinity | Infinity | | |
| 1* | 12.085 | 1.383 | 1.5443 | 55.86 (=νd1) |
| 2* | −22.067 | 0.046 | | |
| 3* | 52.315 | 0.976 | 1.5348 | 55.66 (=νd2) |
| 4* | −45.642 | 0.083 | | |
| 5 (Stop) | Infinity | 0.168 | | |
| 6* | 4.997 | 0.702 | 1.6503 | 21.54 (=νd3) |
| 7* | 3.241 | 1.115 | | |
| 8* | 33.871 | 1.819 | 1.5348 | 55.66 (=νd4) |
| 9* | −11.326 | 0.197 | | |
| 10* | 20.175 | 0.847 | 1.5348 | 55.66 (=νd5) |
| 11* | 11.042 | 0.956 | | |
| 12* | −32.105 | 1.387 | 1.5443 | 55.86 (=νd6) |
| 13* | −4.516 | 0.030 | | |
| 14* | 28.241 (=r13) | 1.677 | 1.6142 | 25.58 (=νd7) |
| 15* | 9.216 (=r14) | 1.050 | | |
| 16* | 16.578 | 0.976 | 1.5348 | 55.66 (=νd8) |
| 17* | 4.241 (=r16) | 0.550 | | |
| 18 | Infinity | 0.210 | 1.5168 | 64.20 |
| 19 | Infinity | 0.619 | | |
| Image Plane | Infinity | | | |

| Constituent Lens Data | | | Composite Focal Length | |
|---|---|---|---|---|
| Lens | Start Surface | Focal Length | Lens | Focal Length |
| 1 | 1 | 14.55 | 1, 2, 3 | 22.62 |
| 2 | 3 | 45.74 | | |
| 3 | 6 | −16.84 | | |
| 4 | 8 | 16.10 | | |
| 5 | 10 | −47.13 | | |
| 6 | 12 | 9.49 | | |
| 7 | 14 | −23.04 | | |
| 8 | 16 | −10.96 | | |

TABLE 5-continued

Unit [mm]

Aspheric Surface data

| | First Surface | Second Surface | Fourth Surface | Fifth Surface | Sixth Surface | Seventh Surface | Eighth Surface | Ninth Surface |
|---|---|---|---|---|---|---|---|---|
| k | 0.000E+00 | 0.000E+00 | 0.000E+00 | 0.000E+00 | −1.696E−01 | −2.347E−01 | 0.000E+00 | 0.000E+00 |
| A4 | −4.135E−04 | 5.471E−04 | 1.066E−03 | −1.202E−04 | −1.085E−02 | −1.476E−02 | 2.274E−04 | −2.481E−03 |
| A6 | −5.549E−05 | 6.748E−05 | 3.489E−05 | 1.116E−04 | 1.028E−03 | 1.177E−03 | −2.336E−04 | −9.496E−05 |
| A8 | 4.888E−06 | −3.587E−06 | 3.711E−06 | −5.746E−06 | −8.211E−05 | −1.192E−04 | 2.420E−05 | 1.870E−06 |
| A10 | −1.265E−07 | 2.630E−08 | −3.416E−07 | −2.968E−08 | 3.033E−06 | 5.844E−06 | −2.312E−06 | −3.985E−07 |
| A12 | 0.000E+00 | 0.000E+00 | 0.000E+00 | 0.000E+00 | −4.838E−08 | −1.957E−07 | 0.000E+00 | 0.000E+00 |
| A14 | 0.000E+00 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 | 0.000E+00 |

| | Tenth Surface | Eleventh Surface | Twelfth Surface | Thirteenth Surface | Fourteenth Surface | Fifteenth Surface | Sixteenth Surface | Seventeenth Surface |
|---|---|---|---|---|---|---|---|---|
| k | 0.000E+00 | 0.000E+00 | 0.000E+00 | −1.537E+00 | 0.000E+00 | 0.000E+00 | 0.000E+00 | −5.064E+00 |
| A4 | −6.384E−03 | −4.574E−03 | −8.538E−04 | −3.218E−04 | −2.096E−03 | −1.428E−03 | −1.018E−02 | −6.167E−03 |
| A6 | −1.112E−04 | −3.609E−05 | 2.978E−04 | 1.867E−04 | 4.652E−05 | −3.814E−04 | 2.357E−04 | 2.863E−04 |
| A8 | 6.306E−06 | −4.989E−06 | −3.947E−05 | −2.354E−05 | −4.117E−05 | 3.678E−05 | 1.539E−05 | −1.010E−05 |
| A10 | 0.000E+00 | 0.000E+00 | 1.143E−06 | 9.332E−07 | 4.988E−06 | −1.893E−06 | −8.960E−07 | 2.530E−07 |
| A12 | 0.000E+00 | 0.000E+00 | 0.000E+00 | 0.000E+00 | −2.694E−07 | 5.840E−08 | 1.713E−08 | −3.572E−09 |
| A14 | 0.000E+00 | 0.000E+00 | 0.000E+00 | 0.000E+00 | 5.378E−09 | −9.962E−10 | −1.163E−10 | 2.053E−11 |
| A16 | 0.000E+00 | 0.000E+00 | 0.000E+00 | 0.000E+00 | 0.000E+00 | 7.125E−12 | 0.000E+00 | 0.000E+00 |

The imaging lens in Example 5 satisfies all of conditional expressions (1) to (12) as shown in Table 8.

Figure 10:
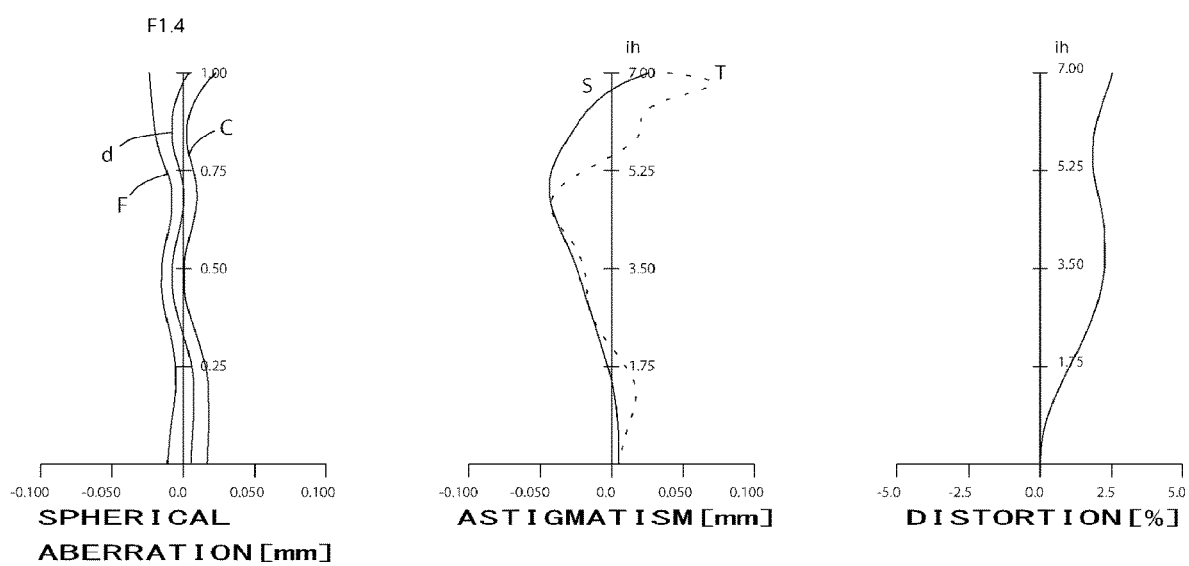
FIG. 10 shows spherical aberration, astigmatism, and distortion of the imaging lens in Example 5 according to the embodiment of the present invention.

FIG. 10 shows spherical aberration (mm), astigmatism (mm), and distortion (%) of the imaging lens in Example 5. As shown in FIG. 10, each aberration is corrected properly.

Example 6

Basic lens data are shown in below Table 6.

TABLE 6

Unit [mm]

f = 10.78
Fno = 1.4
ω (°) = 32.3

Surface Data

| Surface Number i | Curvature Radius r | Surface Distance d | Refractive Index Nd | Abbe Number vd |
|---|---|---|---|---|
| (Object) | Infinity | Infinity | | |
| 1* | 8.012 | 1.441 | 1.5443 | 55.86 (=vd1) |
| 2* | 500.000 | 0.182 | | |
| 3 (Stop) | Infinity | 0.025 | | |
| 4* | 31.059 | 0.947 | 1.5348 | 55.66 (=vd2) |
| 5* | 104.847 | 0.033 | | |
| 6* | 6.665 | 0.621 | 1.6503 | 21.54 (=vd3) |
| 7* | 4.265 | 0.879 | | |
| 8* | 14.405 | 1.516 | 1.5348 | 55.66 (=vd4) |
| 9* | −158.049 | 0.030 | | |
| 10* | 8.339 | 0.784 | 1.5348 | 55.66 (=vd5) |
| 11* | 7.732 | 1.821 | | |
| 12* | −113.609 | 1.485 | 1.5443 | 55.86 (=vd6) |
| 13* | −6.401 | 0.030 | | |
| 14* | 33.865 (=r13) | 2.055 | 1.6142 | 25.58 (=vd7) |
| 15* | 10.413 (=r14) | 0.980 | | |
| 16* | 9.443 | 1.067 | 1.5348 | 55.66 (=vd8) |
| 17* | 4.104 (=r16) | 0.600 | | |
| 18 | Infinity | 0.210 | 1.5168 | 64.20 |
| 19 | Infinity | 0.608 | | |
| Image Plane | Infinity | | | |

TABLE 6-continued

Unit [mm]

Constituent Lens Data

| Lens | Start Surface | Focal Length |
|---|---|---|
| 1 | 1 | 14.94 |
| 2 | 4 | 82.15 |
| 3 | 6 | −20.29 |
| 4 | 8 | 24.76 |
| 5 | 10 | −361.26 |
| 6 | 12 | 12.40 |
| 7 | 14 | −25.33 |
| 8 | 16 | −14.59 |

Composite Focal Length

| Lens | Focal Length |
|---|---|
| 1, 2, 3 | 24.99 |

Aspheric Surface data

| | First Surface | Second Surface | Fourth Surface | Fifth Surface | Sixth Surface | Seventh Surface | Eighth Surface | Ninth Surface |
|---|---|---|---|---|---|---|---|---|
| k | 0.000E+00 | 0.000E+00 | 0.000E+00 | 0.000E+00 | 0.000E+00 | 0.000E+00 | 0.000E+00 | 0.000E+00 |
| A4 | −3.086E−04 | −1.119E−04 | 1.145E−03 | 1.926E−04 | −8.542E−03 | −1.064E−02 | 6.364E−04 | −1.035E−03 |
| A6 | −5.894E−05 | 5.614E−05 | −2.107E−05 | −9.174E−06 | 8.311E−04 | 8.898E−04 | −2.378E−04 | −1.291E−04 |
| A8 | 3.949E−06 | −3.523E−06 | 2.641E−06 | −4.940E−06 | −5.645E−05 | −7.118E−05 | 1.354E−05 | −8.130E−07 |
| A10 | −1.950E−07 | 5.667E−09 | −2.871E−07 | 1.138E−07 | 1.774E−06 | 3.103E−06 | −4.160E−07 | 2.915E−07 |
| A12 | 1.125E−09 | 0.000E+00 | 6.407E−09 | 2.517E−09 | −1.678E−08 | −7.492E−08 | 0.000E+00 | −4.761E−09 |
| A14 | 0.000E+00 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 | 0.000E+00 |

| | Tenth Surface | Eleventh Surface | Twelfth Surface | Thirteenth Surface | Fourteenth Surface | Fifteenth Surface | Sixteenth Surface | Seventeenth Surface |
|---|---|---|---|---|---|---|---|---|
| k | 0.000E+00 | 0.000E+00 | 0.000E+00 | −2.119E+00 | 0.000E+00 | 0.000E+00 | 0.000E+00 | −4.030E+00 |
| A4 | −5.713E−03 | −4.106E−03 | −5.672E−04 | 6.260E−08 | −9.062E−04 | −4.136E−04 | −8.951E−03 | −5.200E−03 |
| A6 | −2.956E−05 | −5.567E−05 | 1.634E−04 | 8.574E−05 | −2.403E−05 | −2.974E−04 | 1.626E−04 | 2.214E−04 |
| A8 | −2.817E−06 | 1.167E−06 | −2.484E−05 | −1.597E−05 | −2.330E−05 | 2.361E−05 | 1.011E−05 | −6.456E−06 |
| A10 | 3.099E−07 | 0.000E+00 | 6.637E−07 | 5.766E−07 | 2.815E−06 | −1.026E−06 | −4.948E−07 | 1.285E−07 |
| A12 | 0.000E+00 | 0.000E+00 | 0.000E+00 | 0.000E+00 | −1.283E−07 | 2.740E−08 | 8.047E−09 | −1.403E−09 |
| A14 | 0.000E+00 | 0.000E+00 | 0.000E+00 | 0.000E+00 | 2.058E−09 | −4.235E−10 | −4.607E−11 | 5.793E−12 |
| A16 | 0.000E+00 | 0.000E+00 | 0.000E+00 | 0.000E+00 | 0.000E+00 | 2.881E−12 | 0.000E+00 | 0.000E+00 |

The imaging lens in Example 6 satisfies all of conditional expressions (1) to (12) as shown in Table 8.

Figure 12:
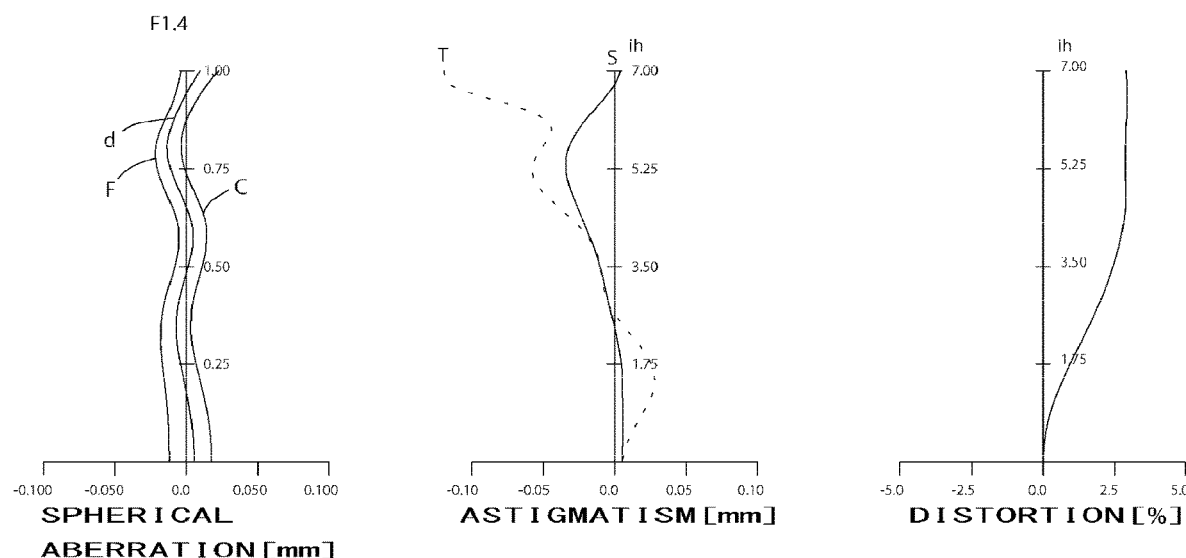
FIG. 12 shows spherical aberration, astigmatism, and distortion of the imaging lens in Example 6 according to the embodiment of the present invention.

FIG. 12 shows spherical aberration (mm), astigmatism (mm), and distortion (%) of the imaging lens in Example 6. As shown in FIG. 12, each aberration is corrected properly.

Example 7

Basic lens data are shown in below Table 7.

TABLE 7

Unit [mm]

$f = 10.11$
$Fno = 1.2$
$\omega\ (°) = 34.0$

Surface Data

| Surface Number i | Curvature Radius r | Surface Distance d | Refractive Index Nd | Abbe Number vd |
|---|---|---|---|---|
| (Object) | Infinity | Infinity | | |
| 1* | 10.402 | 1.500 | 1.5443 | 55.86 (=vd1) |
| 2* | −20.361 | 0.005 | | |
| 3 (Stop) | Infinity | 0.030 | | |
| 4* | 55.788 | 1.000 | 1.5348 | 55.66 (=vd2) |
| 5* | −580.859 | 0.028 | | |
| 6* | 6.296 | 0.695 | 1.6503 | 21.54 (=vd3) |
| 7* | 4.057 | 1.303 | | |
| 8* | 50.551 | 1.425 | 1.5348 | 55.66 (=vd4) |
| 9* | −94.325 | 0.217 | | |
| 10* | 9.374 | 1.016 | 1.5348 | 55.66 (=vd5) |
| 11* | 9.164 | 1.085 | | |
| 12* | 57.036 | 1.611 | 1.5443 | 55.86 (=vd6) |

TABLE 7-continued

Unit [mm]

| | | | | |
|---|---|---|---|---|
| 13* | −5.241 | 0.030 | | |
| 14* | 17.166 (=r13) | 1.571 | 1.6503 | 21.54 (=vd7) |
| 15* | 7.582 (=r14) | 1.191 | | |
| 16* | 12.898 | 1.041 | 1.5348 | 55.66 (=vd8) |
| 17* | 4.278 (=r16) | 0.620 | | |
| 18 | Infinity | 0.210 | 1.5168 | 64.20 |
| 19 | Infinity | 0.608 | | |
| Image Plane | Infinity | | | |

| Constituent Lens Data | | | Composite Focal Length | |
|---|---|---|---|---|
| Lens | Start Surface | Focal Length | Lens | Focal Length |
| 1 | 1 | 12.87 | 1, 2, 3 | 20.37 |
| 2 | 4 | 95.22 | | |
| 3 | 6 | −19.98 | | |
| 4 | 8 | 61.75 | | |
| 5 | 10 | 1114.45 | | |
| 6 | 12 | 8.90 | | |
| 7 | 14 | −22.32 | | |
| 8 | 16 | −12.49 | | |

Aspheric Surface data

| | First Surface | Second Surface | Fourth Surface | Fifth Surface | Sixth Surface | Seventh Surface | Eighth Surface | Ninth Surface |
|---|---|---|---|---|---|---|---|---|
| k | −2.764E−01 | −9.059E+00 | 5.206E+01 | 0.000E+00 | 0.000E+00 | 0.000E+00 | 0.000E+00 | 0.000E+00 |
| A4 | −4.787E−04 | 4.425E−05 | 1.101E−03 | −1.120E−04 | −8.629E−03 | −1.105E−02 | 5.150E−04 | −1.316E−03 |
| A6 | −6.870E−05 | 5.482E−05 | −2.443E−05 | −3.613E−06 | 7.967E−04 | 8.693E−04 | −2.429E−04 | −1.685E−04 |
| A8 | 5.218E−06 | −3.296E−06 | 3.312E−06 | −4.778E−06 | −5.730E−05 | −7.483E−05 | 1.449E−05 | −1.080E−06 |
| A10 | −1.856E−07 | 3.192E−08 | −3.036E−07 | 1.336E−07 | 1.704E−06 | 3.067E−06 | −7.901E−07 | 3.381E−07 |
| A12 | 1.110E−09 | −1.753E−11 | 5.050E−09 | −3.009E−10 | −9.932E−09 | −7.107E−08 | −2.307E−09 | −1.198E−08 |
| A14 | 0.000E+00 | 0.000E+00 | 0.000E+00 | 0.000E+00 | 0.000E+00 | −1.132E−10 | 0.000E+00 | 0.000E+00 |
| A16 | 0.000E+00 | 0.000E+00 | 0.000E+00 | 0.000E+00 | 0.000E+00 | 0.000E+00 | 0.000E+00 | 0.000E+00 |

| | Tenth Surface | Eleventh Surface | Twelfth Surface | Thirteenth Surface | Fourteenth Surface | Fifteenth Surface | Sixteenth Surface | Seventeenth Surface |
|---|---|---|---|---|---|---|---|---|
| k | 0.000E+00 | 0.000E+00 | 0.000E+00 | −2.951E+00 | 0.000E+00 | 0.000E+00 | 0.000E+00 | −4.467E+00 |
| A4 | −5.112E−03 | −4.196E−03 | −7.192E−04 | −4.503E−05 | 1.324E−03 | −1.769E−03 | −8.461E−03 | −5.138E−03 |
| A6 | −2.888E−05 | −4.279E−05 | 1.680E−04 | 8.623E−05 | −3.618E−05 | −2.721E−04 | 1.614E−04 | 2.141E−04 |
| A8 | −3.473E−06 | −6.380E−07 | −2.502E−05 | −1.371E−05 | −2.444E−05 | 2.353E−05 | 9.954E−06 | −6.403E−06 |
| A10 | 2.746E−07 | 0.000E+00 | 6.781E−07 | 3.956E−07 | 2.934E−06 | −1.042E−06 | −4.939E−07 | 1.343E−07 |
| A12 | 0.000E+00 | 0.000E+00 | 0.000E+00 | 4.650E−09 | −1.303E−07 | 2.771E−08 | 8.192E−09 | −1.604E−09 |
| A14 | 0.000E+00 | 0.000E+00 | 0.000E+00 | 0.000E+00 | 2.047E−09 | −4.203E−10 | −4.839E−11 | 7.750E−12 |
| A16 | 0.000E+00 | 0.000E+00 | 0.000E+00 | 0.000E+00 | 0.000E+00 | 2.781E−12 | 0.000E+00 | 0.000E+00 |

The imaging lens in Example 7 satisfies all of conditional expressions (1) to (12) as shown in Table 8.

Figure 14:
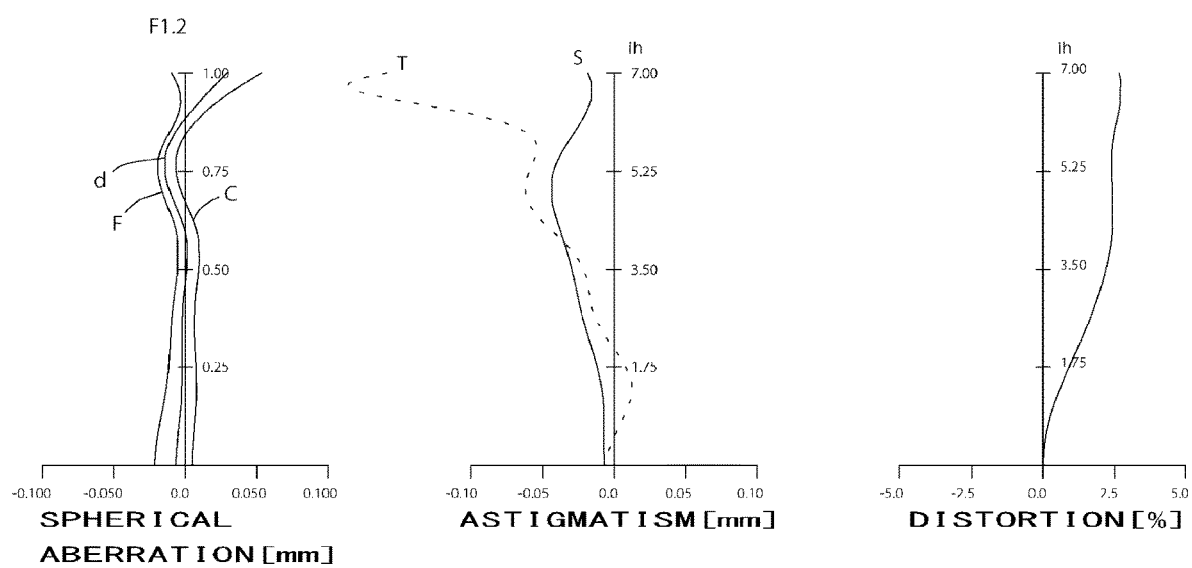
FIG. 14 shows spherical aberration, astigmatism, and distortion of the imaging lens in Example 7 according to the embodiment of the present invention.

FIG. 14 shows spherical aberration (mm), astigmatism (mm), and distortion (%) of the imaging lens in Example 7. As shown in FIG. 14, each aberration is corrected properly.

Below Table 8 shows each parameter, and conditional expressions (1) to (12) relating to Examples 1 to 7.

TABLE 8

| | Example 1 | Example 2 | Example 3 | Example 4 | Example 5 | Example 6 | Example 7 |
|---|---|---|---|---|---|---|---|
| Parameters | | | | | | | |
| f | 11.68 | 7.75 | 8.04 | 9.62 | 9.76 | 10.78 | 10.11 |
| Σd | 15.35 | 8.11 | 8.39 | 11.90 | 13.42 | 13.90 | 13.75 |
| Ph82 | 4.33 | 1.92 | 1.92 | 3.27 | 3.12 | 3.77 | 3.58 |
| r13 | 10.383 | −10.030 | −10.761 | 39.334 | 28.241 | 33.865 | 17.166 |
| r14 | 5.263 | −16.894 | −13.519 | 12.785 | 9.216 | 10.413 | 7.582 |
| r16 | 4.227 | 2.901 | 3.270 | 4.724 | 4.241 | 4.104 | 4.278 |
| f7 | −17.38 | −41.22 | −105.20 | −31.43 | −23.04 | −25.33 | −22.32 |
| f8 | −86.89 | −6.25 | −6.29 | −8.76 | −10.96 | −14.59 | −12.49 |
| vd8 | 55.66 | 55.66 | 55.66 | 55.66 | 55.66 | 55.66 | 55.66 |
| vd7 | 21.54 | 21.54 | 25.58 | 25.58 | 25.58 | 25.58 | 21.54 |
| f123 | 16.74 | 7.63 | 7.94 | 15.12 | 22.62 | 24.99 | 20.37 |
| TTL | 17.04 | 9.58 | 9.84 | 13.34 | 14.73 | 15.24 | 15.11 |

TABLE 8-continued

|  | Example 1 | Example 2 | Example 3 | Example 4 | Example 5 | Example 6 | Example 7 |
| --- | --- | --- | --- | --- | --- | --- | --- |
| ih | 7.99 | 5.06 | 5.06 | 7.00 | 7.00 | 7.00 | 7.00 |
| Fno | 1.4 | 1.6 | 1.6 | 1.4 | 1.4 | 1.4 | 1.2 |
| f4 | −1702.49 | −55.78 | −76.21 | 57.60 | 16.10 | 24.76 | 61.75 |
| f5 | 14.52 | 144.95 | 146.22 | −147.07 | −47.13 | −361.26 | 1114.45 |
| f6 | −67.86 | 8.89 | 10.06 | 8.30 | 9.49 | 12.40 | 3.90 |
| Conditional Expressions |  |  |  |  |  |  |  |
| (1) $0.5 < \Sigma d/f < 2.1$ | 1.31 | 1.05 | 1.04 | 1.24 | 1.38 | 1.29 | 1.36 |
| (2) $0.1 < Ph82/ih < 0.9$ | 0.54 | 0.38 | 0.38 | 0.47 | 0.45 | 0.54 | 0.51 |
| (3) $0.3 < r13/r14 < 4.9$ | 1.97 | 0.59 | 0.80 | 3.08 | 3.06 | 3.25 | 2.26 |
| (4) $0.2 < r16/f < 0.8$ | 0.36 | 0.37 | 0.41 | 0.49 | 0.43 | 0.38 | 0.42 |
| (5) $0.4 < |f/f7| + |f/f8| < 2.2$ | 0.81 | 1.43 | 1.35 | 1.40 | 1.31 | 1.16 | 1.26 |
| (6) $15 < vd8 - vd7 < 52$ | 34.13 | 34.13 | 30.09 | 30.09 | 30.09 | 30.09 | 34.13 |
| (7) $f123/f < 3.5$ | 1.43 | 0.98 | 0.99 | 1.57 | 2.32 | 2.32 | 2.02 |
| (8) $-1.9 < f/f8 < -0.07$ | −0.13 | −1.24 | −1.28 | −1.10 | −0.89 | −0.74 | −0.81 |
| (9) $0.6 < TTL/2ih < 1.3$ | 1.07 | 0.95 | 0.97 | 0.95 | 1.05 | 1.09 | 1.08 |
| (10) $0.5 < ih/f < 0.9$ | 0.68 | 0.65 | 0.63 | 0.73 | 0.72 | 0.65 | 0.69 |
| (11) Fno ≤ 1.8 | 1.40 | 1.60 | 1.60 | 1.40 | 1.40 | 1.40 | 1.20 |
| (12) $|f/f4| + |f/f5| + |f/f6| < 2.8$ | 0.98 | 1.07 | 0.96 | 1.39 | 1.84 | 1.33 | 1.31 |

As explained so far, if the imaging lens according to the present invention of eight constituent is applied to an increasingly compact and low-profile smartphone, or mobile terminals, or a game console, or an information terminal such as a PC and a robot, or a home appliance or a car with a camera function, it can contribute to the low-profileness and low f value of the camera, and realize high-performance of camera.

An effect of the present invention is to satisfy demand of low-profileness and low F value, and obtain a compact imaging lens having high resolution with correction of aberrations.

What is claimed is:

1. An imaging lens forming an image of an object on a solid-state image sensor, in which the lenses are arranged in order from an object side to an image side, comprising:
   a first lens having positive refractive power,
   a second lens having negative refractive power,
   a third lens having the positive refractive power,
   a fourth lens having the negative refractive power and a meniscus shape near an optical axis,
   a fifth lens having the positive refractive power,
   a sixth lens,
   a seventh lens having the negative refractive power, and
   an eighth lens having the negative refractive power and being a double-sided aspheric lens,
   wherein the eighth lens has at least one pole point off the optical axis on an aspheric image-side surface.

2. The imaging lens according to claim 1, wherein a conditional expression (1) below is satisfied:

$$0.5 < \Sigma d/f < 2.1 \quad (1)$$

where
   f: a focal length of the overall optical system, and
   Σd: a distance along the optical axis from an object-side surface of the first lens to an image-side surface of the eighth lens.

3. The imaging lens according to claim 1, wherein the first lens to the eighth lens are arranged with air gaps without cementing lens surfaces of lenses adjacent to each other.

4. The imaging lens according to claim 1, wherein a conditional expression (2) below is satisfied:

$$0.1 < Ph82/ih < 0.9 \quad (2)$$

where
   Ph82: a height perpendicular to the optical axis of the pole point formed on the image-side surface of the eighth lens; and
   Ih: a maximum image height.

5. The imaging lens according to claim 1, wherein a conditional expression (3) below is satisfied:

$$0.3 < |r13/r14| < 4.9 \quad (3)$$

where
   r13: a curvature radius near the optical axis of the object-side surface of the seventh lens, and
   r14: a curvature radius near the optical axis of the image-side surface of the seventh lens.

6. The imaging lens according to claim 1, wherein a conditional expression (4) below is satisfied:

$$0.2 < r16/f < 0.8 \quad (4)$$

where
   f: the focal length of the overall optical system, and
   r16: a curvature radius of the image-side surface of the eighth lens.

7. The imaging lens according to claim 1, wherein a conditional expression (5) below is satisfied:

$$0.4 < |f/f7| + |f/f8| < 2.2 \quad (5)$$

where
   f: the focal length of the overall optical system,
   f7: a focal length of the seventh lens, and
   f8: a focal length of the eighth lens.

8. The imaging lens according to claim 1, wherein a conditional expression (6) below is satisfied:

$$15 < vd8 - vd7 < 52 \quad (6)$$

where
   vd7: an Abbe number of the seventh lens at d-ray, and
   vd8: an Abbe number of the eighth lens at d-ray.

9. The imaging lens according to claim 1, wherein a conditional expression (8) below is satisfied:

$$-1.9 < f/f8 < -0.07 \quad (8)$$

where
   f: the focal length of the overall optical system, and
   f8: the focal length of the eighth lens.

10. The imaging lens according to claim 1, wherein a conditional expression (9) below is satisfied:

$$0.6 < TTL/2ih < 1.3 \quad (9)$$

where
TTL: a total track length, and
Ih: the maximum image height.

11. The imaging lens according to claim 1, wherein a conditional expression (10) below is satisfied:

$$0.5 < ih/f < 0.9 \quad (10)$$

where
f: the focal length of the overall optical system, and
ih: the maximum image height.

12. The imaging lens according to claim 1, wherein a conditional expression (11) below is satisfied:

$$Fno \le 1.8 \quad (11)$$

where
Fno: F-number.

13. An imaging lens forming an image of an object on a solid-state image sensor, in which the lenses are arranged in order from an object side to an image side, comprising:
a first lens having positive refractive power,
a second lens having negative refractive power,
a third lens having the positive refractive power and a meniscus shape near an optical axis,
a fourth lens having the negative refractive power,
a fifth lens having the positive refractive power and a meniscus shape near the optical axis,
a sixth lens,
a seventh lens having the negative refractive power, and
an eighth lens having the negative refractive power and being a double-sided aspheric lens,
wherein the eighth lens has at least one pole point off the optical axis on an aspheric image-side surface.

14. The imaging lens according to claim 13, wherein a conditional expression (1) below is satisfied:

$$0.5 < \Sigma d/f < 2.1 \quad (1)$$

where
f: a focal length of the overall optical system, and
$\Sigma d$: a distance along the optical axis from an object-side surface of the first lens to an image-side surface of the eighth lens.

15. The imaging lens according to claim 13, wherein the first lens to the eighth lens are arranged with air gaps without cementing lens surfaces of lenses adjacent to each other.

16. The imaging lens according to claim 13, wherein a conditional expression (2) below is satisfied:

$$0.1 < Ph82/ih < 0.9 \quad (2)$$

where
Ph82: a height perpendicular to the optical axis of the pole point formed on the image-side surface of the eighth lens; and
Ih: a maximum image height.

17. The imaging lens according to claim 13, wherein a conditional expression (3) below is satisfied:

$$0.3 < |r13/r14| < 4.9 \quad (3)$$

where
r13: a curvature radius near the optical axis of the object-side surface of the seventh lens, and
r14: a curvature radius near the optical axis of the image-side surface of the seventh lens.

18. The imaging lens according to claim 13, wherein a conditional expression (4) below is satisfied:

$$0.2 < r16/f < 0.8 \quad (4)$$

where
f: the focal length of the overall optical system, and
r16: a curvature radius of the image-side surface of the eighth lens.

19. The imaging lens according to claim 13, wherein a conditional expression (5) below is satisfied:

$$0.4 < |f/f7| + |f/f8| < 2.2 \quad (5)$$

where
f: the focal length of the overall optical system,
f7: a focal length of the seventh lens, and
f8: a focal length of the eighth lens.

20. The imaging lens according to claim 13, wherein a conditional expression (6) below is satisfied:

$$15 < vd8 - vd7 < 52 \quad (6)$$

where
vd7: an Abbe number of the seventh lens at d-ray, and
vd8: an Abbe number of the eighth lens at d-ray.

* * * * *